(12) United States Patent
Fei et al.

(10) Patent No.: US 10,320,437 B2
(45) Date of Patent: Jun. 11, 2019

(54) SYSTEM AND METHOD FOR IMMERSIVE AND INTERACTIVE MULTIMEDIA GENERATION

(71) Applicant: USENS, INC., San Jose, CA (US)

(72) Inventors: Yue Fei, San Jose, CA (US); Anli He, San Jose, CA (US)

(73) Assignee: USens, Inc., San Jose, CA (US)

( * ) Notice: Subject to any disclaimer, the term of this patent is extended or adjusted under 35 U.S.C. 154(b) by 0 days.

(21) Appl. No.: 15/060,462

(22) Filed: Mar. 3, 2016

(65) Prior Publication Data

US 2016/0261300 A1    Sep. 8, 2016

Related U.S. Application Data

(63) Continuation-in-part of application No. PCT/US2015/000116, filed on Oct. 23, 2015.
(Continued)

(51) Int. Cl.
*H04M 1/00*        (2006.01)
*H04B 1/38*        (2015.01)
(Continued)

(52) U.S. Cl.
CPC ............ *H04B 1/385* (2013.01); *G01B 11/14* (2013.01); *G01B 11/22* (2013.01); *G02B 27/0176* (2013.01); *G06F 3/012* (2013.01); *G06F 3/017* (2013.01); *G06T 7/246* (2017.01); *G06T 7/593* (2017.01); *G06T 19/003* (2013.01); *G06T 19/006* (2013.01); *H04N 5/33* (2013.01); *H04W 4/026* (2013.01); *H04W 4/70* (2018.02); *G01C 3/08* (2013.01); *G01S 17/08* (2013.01); *G02B 2027/0138* (2013.01); *G02B 2027/0141* (2013.01); *G02B 2027/0154* (2013.01); *G06T 2207/10021* (2013.01);
(Continued)

(58) Field of Classification Search
USPC ..................... 455/566, 575.2; 345/419, 633
See application file for complete search history.

(56) References Cited

U.S. PATENT DOCUMENTS 5,243,665 A    9/1993  Maney et al.
6,151,009 A *  11/2000  Kanade ................. G06T 15/405
                                                345/641
(Continued)

OTHER PUBLICATIONS

Non-Final Office Action for U.S. Appl. No. 14/923,073, dated Feb. 1, 2017, 13 pages.
(Continued)

*Primary Examiner* — Edward F Urban
*Assistant Examiner* — Rui M Hu
(74) *Attorney, Agent, or Firm* — Sheppard Mullin Richter & Hampton LLP

(57) ABSTRACT

A foldable apparatus is disclosed. The apparatus may comprise at least one camera configured to acquire an image of a physical environment, an orientation and position determination module configured to determine a change in orientation and/or position of the apparatus with respect to the physical environment based on the acquired image, a housing configured to hold the at least one camera and the orientation and position determination module, and a first strap attached to the housing and configured to attach the housing to a head of a user of the apparatus.

21 Claims, 25 Drawing Sheets

Related U.S. Application Data

(60) Provisional application No. 62/127,947, filed on Mar. 4, 2015, provisional application No. 62/130,859, filed on Mar. 10, 2015, provisional application No. 62/068,423, filed on Oct. 24, 2014.

(51) Int. Cl.

| | |
|---|---|
| *H04B 1/3827* | (2015.01) |
| *H04W 4/02* | (2018.01) |
| *G06T 19/00* | (2011.01) |
| *G02B 27/01* | (2006.01) |
| *H04W 4/70* | (2018.01) |
| *G01B 11/14* | (2006.01) |
| *G01B 11/22* | (2006.01) |
| *G06F 3/01* | (2006.01) |
| *H04N 5/33* | (2006.01) |
| *G06T 7/593* | (2017.01) |
| *G06T 7/246* | (2017.01) |
| *G01C 3/08* | (2006.01) |
| *G01S 17/08* | (2006.01) |

(52) U.S. Cl.
CPC ........... *G06T 2207/10028* (2013.01); *G06T 2207/10048* (2013.01); *G06T 2207/30204* (2013.01); *H04B 2001/3866* (2013.01)

(56) References Cited

U.S. PATENT DOCUMENTS

| | | | | |
|---|---|---|---|---|
| 6,760,050 | B1 * | 7/2004 | Nakagawa | H04S 1/002 463/33 |
| 8,681,151 | B2 * | 3/2014 | Coombe | G06T 19/00 345/423 |
| 8,840,250 | B1 | 9/2014 | Yao et al. | |
| 8,970,693 | B1 | 3/2015 | Chang et al. | |
| 9,459,454 | B1 | 10/2016 | The | |
| 9,599,818 | B2 * | 3/2017 | Yamagishi | G02B 27/017 |
| 9,858,722 | B2 | 1/2018 | Fei et al. | |
| 2005/0083248 | A1 | 4/2005 | Biocca et al. | |
| 2008/0150965 | A1 * | 6/2008 | Bischoff | G02B 27/01 345/632 |
| 2008/0266326 | A1 | 10/2008 | Porwal | |
| 2010/0034404 | A1 * | 2/2010 | Dent | H04R 5/02 381/310 |
| 2010/0121480 | A1 * | 5/2010 | Stelzer | B65G 1/137 700/215 |
| 2010/0265164 | A1 * | 10/2010 | Okuno | G06T 19/006 345/8 |
| 2011/0292463 | A1 * | 12/2011 | Silverbrook | H04N 1/00129 358/462 |
| 2012/0092328 | A1 | 4/2012 | Flaks et al. | |
| 2012/0206452 | A1 * | 8/2012 | Geisner | G02B 27/017 345/419 |
| 2012/0253201 | A1 | 10/2012 | Reinhold | |
| 2012/0306850 | A1 | 12/2012 | Balan | |
| 2013/0050432 | A1 | 2/2013 | Perez et al. | |
| 2013/0194259 | A1 | 8/2013 | Bennett et al. | |
| 2013/0222369 | A1 | 8/2013 | Huston | |
| 2013/0223673 | A1 | 8/2013 | Davis | |
| 2013/0236040 | A1 * | 9/2013 | Crawford | H04S 7/304 381/310 |
| 2013/0282345 | A1 | 10/2013 | McCulloch | |
| 2013/0328928 | A1 * | 12/2013 | Yamagishi | G02B 27/017 345/633 |
| 2013/0335301 | A1 | 12/2013 | Wong et al. | |
| 2014/0002442 | A1 * | 1/2014 | Lamb | G06F 3/1431 345/419 |
| 2014/0152558 | A1 * | 6/2014 | Salter | G06F 3/013 345/157 |
| 2014/0287806 | A1 | 9/2014 | Balachandreswaran | |
| 2014/0300635 | A1 * | 10/2014 | Suzuki | G06T 19/006 345/633 |
| 2014/0306866 | A1 | 10/2014 | Miller et al. | |
| 2014/0306875 | A1 | 10/2014 | He et al. | |
| 2014/0354602 | A1 | 12/2014 | He et al. | |
| 2014/0364212 | A1 * | 12/2014 | Osman | A63F 13/213 463/31 |
| 2014/0375683 | A1 * | 12/2014 | Salter | G06F 3/013 345/633 |
| 2015/0077592 | A1 * | 3/2015 | Fahey | H04N 5/2224 348/239 |
| 2015/0104069 | A1 * | 4/2015 | Li | G01C 21/3647 382/103 |
| 2015/0131966 | A1 * | 5/2015 | Zurek | H04S 3/008 386/241 |
| 2015/0235426 | A1 * | 8/2015 | Lyons | G02B 27/0172 345/8 |
| 2015/0254882 | A1 * | 9/2015 | Englert | G02B 27/017 345/633 |
| 2015/0302648 | A1 | 10/2015 | Zhang | |
| 2015/0381974 | A1 | 12/2015 | Hoffman | |
| 2016/0117860 | A1 | 4/2016 | Fei et al. | |
| 2016/0163110 | A1 * | 6/2016 | Chang | G06T 7/73 345/633 |
| 2016/0184703 | A1 * | 6/2016 | Brav | G06F 3/012 463/30 |
| 2016/0214015 | A1 * | 7/2016 | Osman | A63F 13/213 |
| 2016/0214016 | A1 * | 7/2016 | Stafford | G06F 3/04815 |
| 2016/0259169 | A1 * | 9/2016 | Smith | G02B 3/08 |
| 2016/0260260 | A1 | 9/2016 | Fei et al. | |
| 2017/0061695 | A1 * | 3/2017 | Ishino | G06T 19/003 |
| 2017/0365100 | A1 * | 12/2017 | Walton | G06T 19/006 |
| 2018/0043262 | A1 * | 2/2018 | Gohara | A63F 13/54 |
| 2018/0108180 | A1 | 4/2018 | Fei et al. | |

OTHER PUBLICATIONS

Final Office Action for U.S. Appl. No. 14/923,073, dated May 5, 2017, 21 pages.
International Application No. PCT/US2015/000116, International Search Report and Written Opinion dated Jan. 12, 2016.
Search Report and Written Opinion for International Application No. PCT/US2016/020730, dated Jul. 8, 2016, 22 pages.
Non-Final Office Action for U.S. Appl. No. 15/060,429, dated Jun. 30, 2017, 11 pages.
International Application No. PCT/US2016/020730, International Preliminary Report on Patentability dated Sep. 5, 2017.
Final Office Action for U.S. Appl. No. 15/060,429, dated Jan. 25, 2018, 13 pages.
Office Action for Korean Application No. 10-2017-7013982, dated Feb. 13, 2018, 12 pages.
International Search Report and the Written Opinion dated Sep. 4, 2015, issued in related International Application No. PCT/US2015/036012 (10 pages).
International Preliminary Report on Patentability dated Dec. 29, 2016, issued in related International Application No. PCT/US2015/036012 (9 pages).
International Preliminary Report on Patentability dated May 4, 2017, issued in related International Application No. PCT/US2015/000116 (6 pages).
Non-Final Office Action dated May 4, 2018, issued in related U.S. Appl. No. 15/842,140 (29 pages).
Notice of Allowance dated Oct. 22, 2018, issued in related U.S. Appl. No. 15/842,140 (17 pages).
Notice of Allowance dated Aug. 31, 2017, issued in related U.S. Appl. No. 14/923,073 (17 pages).
Notice of Allowance dated Nov. 19, 2018, issued in related U.S. Appl. No. 15/060,429 (9 pages).

\* cited by examiner

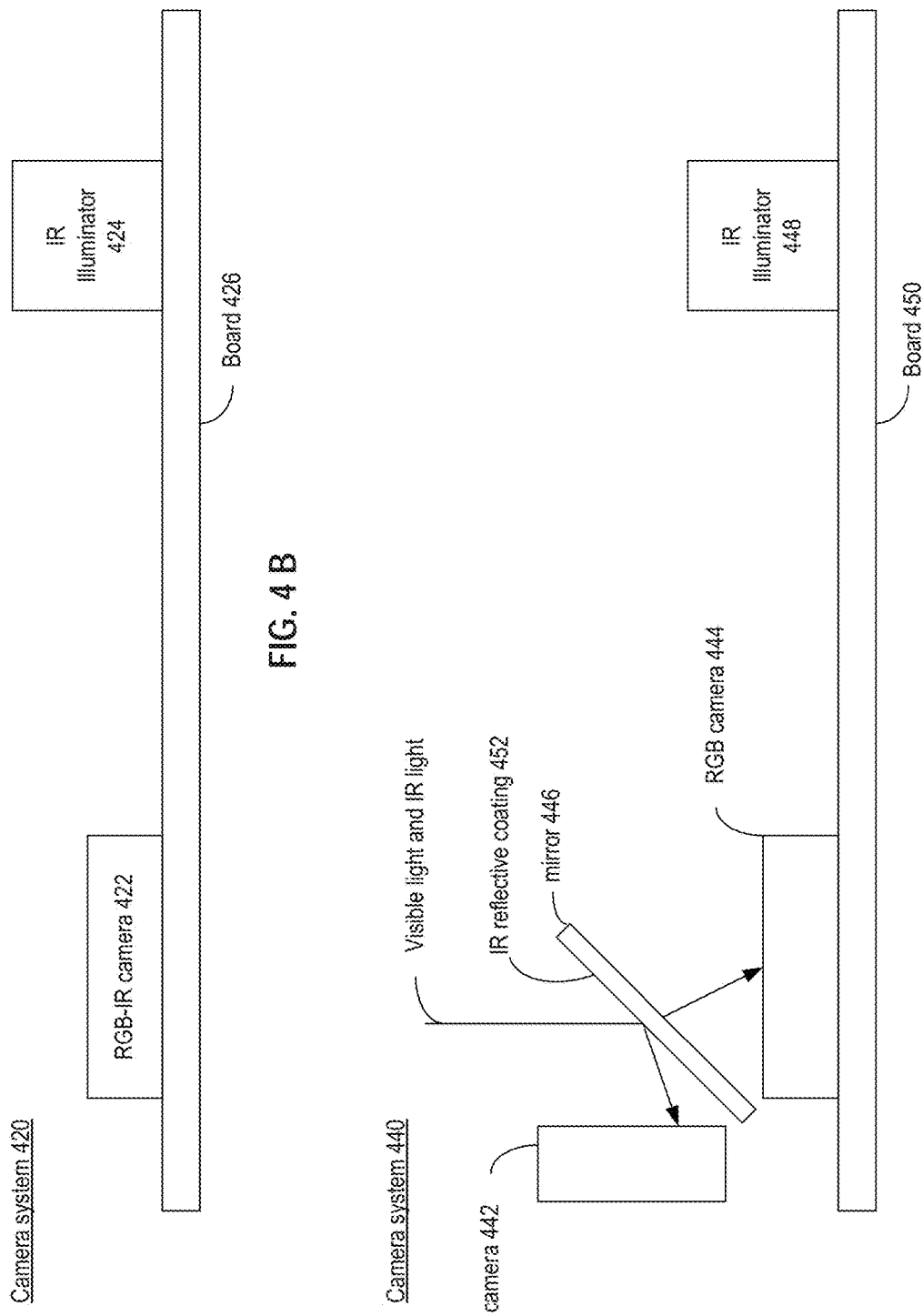

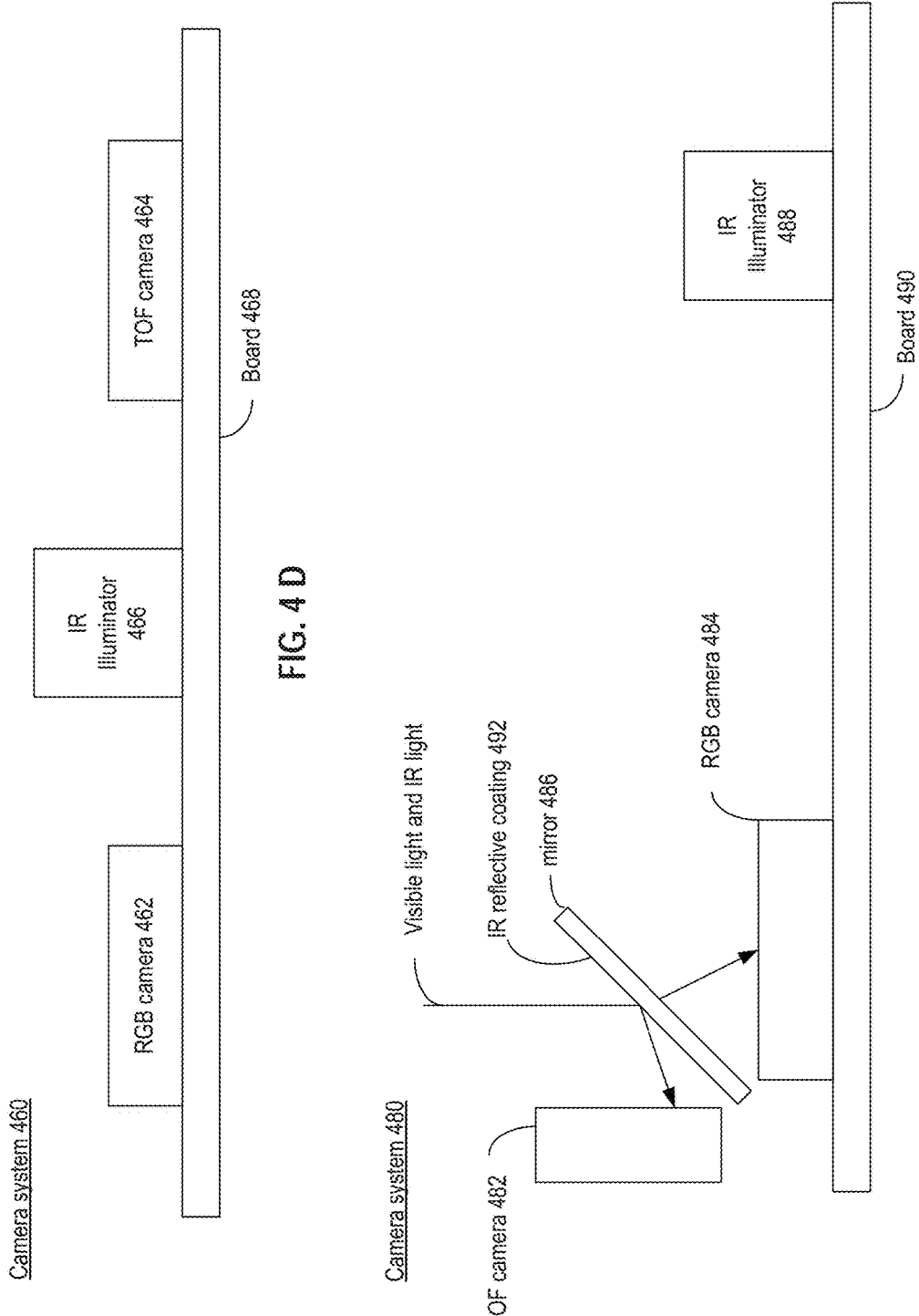

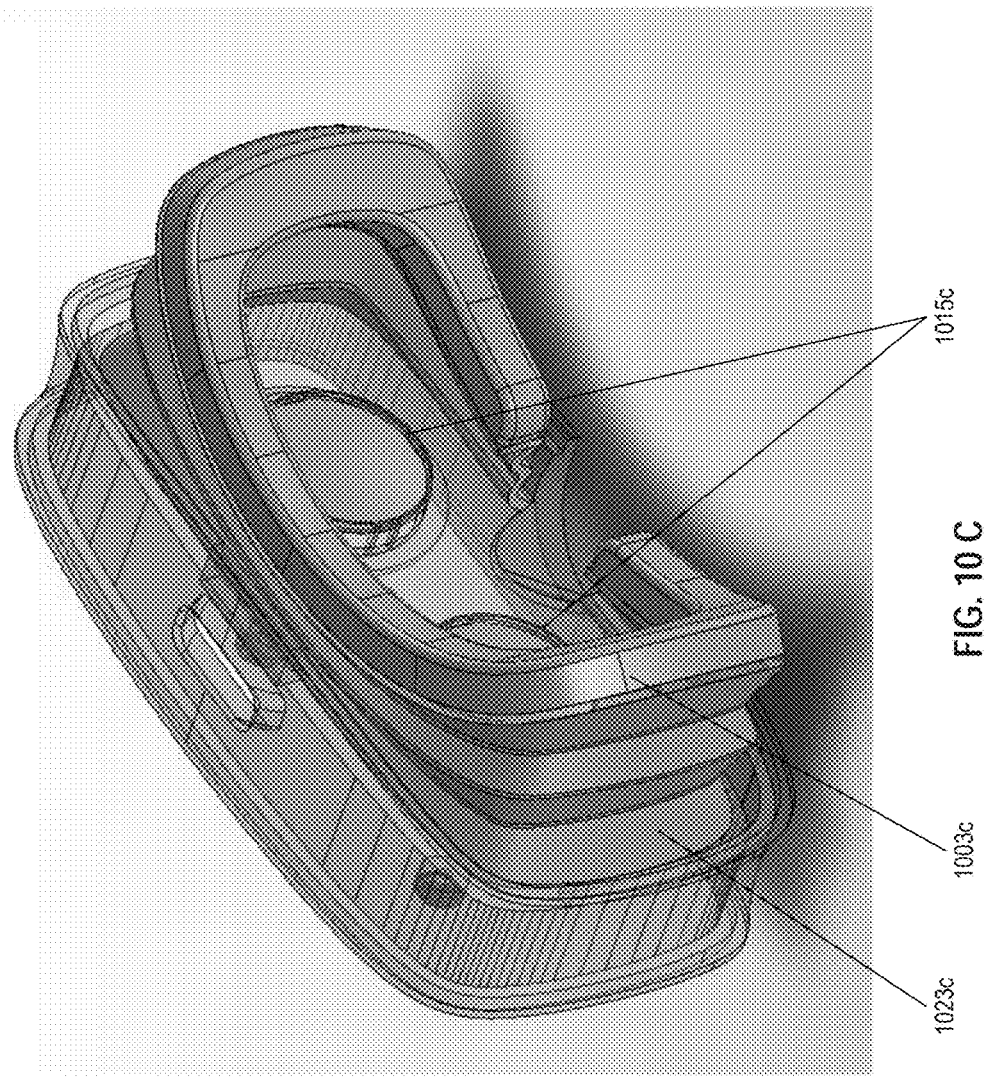

Step 111
Steps to unfold system 1100
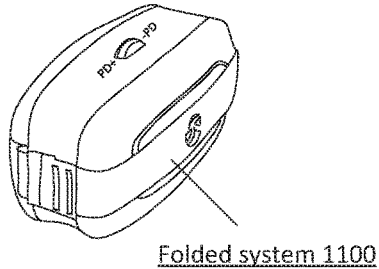
Folded system 1100
Step 112
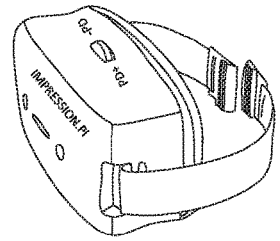
Step 113 (view 1)
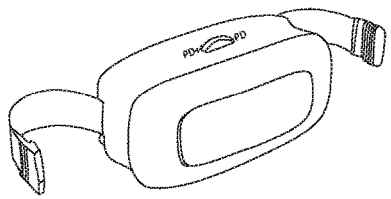
Step 113 (view 2)
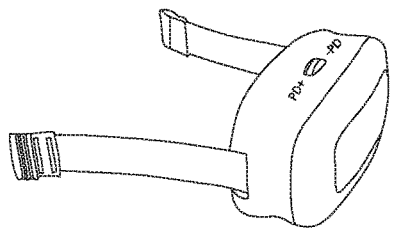
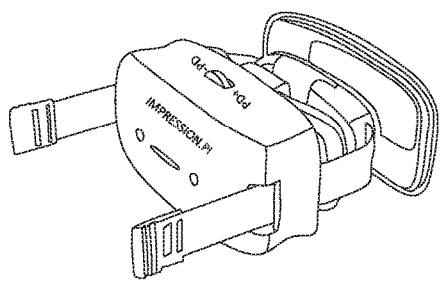
Step 115 (view 1)
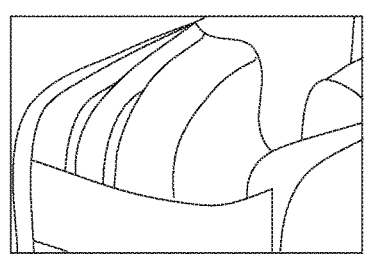
Step 115 (view 2)
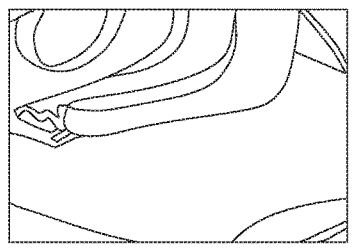
Step 116
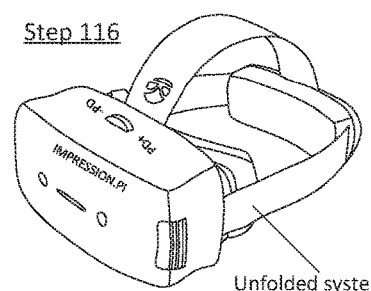
Unfolded system 1100
(Similar to system 1000b)
FIG. 11

SYSTEM AND METHOD FOR IMMERSIVE AND INTERACTIVE MULTIMEDIA GENERATION

CROSS REFERENCE TO RELATED APPLICATIONS

This application claims the benefit of priority to U.S. Provisional Patent Application No. 62/127,947, filed Mar. 4, 2015, and U.S. Provisional Patent Application No. 62/130,859, filed Mar. 10, 2015, and this application also is a continuation-in-part of International Patent Application No. PCT/US2015/000116, filed Oct. 23, 2015, which claims the benefit of priority to U.S. Provisional Patent Application No. 62/068,423, filed Oct. 24, 2014. The contents of all of the above patent applications are hereby incorporated by reference in their entirety.

FIELD

The present disclosure relates to a technical field of human-computer interaction, and in particular to immersive and interactive multimedia generation.

BACKGROUND

Immersive multimedia typically includes providing multimedia data (in the form of audio and video) related to an environment that enables a person who receive the multimedia data to have the experience of being physically present in that environment. The generation of immersive multimedia is typically interactive, such that the multimedia data provided to the person can be automatically updated based on, for example, a physical location of the person, an activity performed by the person, etc. Interactive immersive multimedia can improve the user experience by, for example, making the experience more life-like.

There are two main types of interactive immersive multimedia. The first type is virtual reality (VR), in which the multimedia data replicates an environment that simulates physical presences in places in, for example, the real world or an imaged world. The rendering of the environment also reflects an action performed by the user, thereby enabling the user to interact with the environment. The action (e.g., a body movement) of the user can typically be detected by a motion sensor. Virtual reality artificially creates sensory experiences which can include sight, hearing, touch, etc.

The second type of interactive immersive multimedia is augmented reality (AR), in which the multimedia data includes real-time graphical images of the physical environment in which the person is located, as well as additional digital information. The additional digital information typically is laid on top of the real-time graphical images, but may not alter or enhance the rendering of the real-time graphical images of the physical environment. The additional digital information can also be images of a virtual object, however, typically the image of the virtual object is just laid on top of the real-time graphical images, instead of being blended into the physical environment to create a realistic rendering. The rendering of the physical environment can also reflect an action performed by the user and/or a location of the person to enable interaction. The action (e.g., a body movement) of the user can typically be detected by a motion sensor, while the location of the person can be determined by detecting and tracking features of the physical environment from the graphical images. Augmented reality can replicate some of the sensory experiences of a person while being present in the physical environment, while simultaneously providing the person additional digital information.

Currently, there is no system that can provide a combination of virtual reality and augmented reality that creates a realistic blending of images of virtual objects and images of physical environment. Moreover, while current augmented reality systems can replicate a sensory experience of a user, such systems typically cannot enhance the sensing capability of the user. Further, there is no rendering of the physical environment reflecting an action performed by the user and/or a location of the person to enable interaction, in a virtual and augmented reality rendering.

Further, current mobile head mount display (HMD) based virtual reality devices are bulky and inconvenient to carry. With incorporated sensors and electronics, HMD devices need sufficient power supply. Also, different people have different eyesight and different inter-pupil distances (IPD). In order to provide the best view quality and comfort for users, HMD devices need adjustable mechanisms for eyesight and IPD customization.

SUMMARY OF THE DISCLOSURE

Additional aspects and advantages of embodiments of present disclosure will be given in part in the following descriptions, become apparent in part from the following descriptions, or be learned from the practice of the embodiments of the present disclosure.

According to some embodiments, a foldable apparatus may comprise at least one camera configured to acquire an image of a physical environment, an orientation and position determination module configured to determine a change in orientation and/or position of the apparatus with respect to the physical environment based on the acquired image, a housing configured to hold the at least one camera and the orientation and position determination module, and a first strap attached to the housing and configured to attach the housing to a head of a user of the apparatus.

According to some embodiments, the at least one camera may be further configured to monitor, in real-time, positions of the user relative to objects in the physical environment, and the orientation and position determination module may be further configured to determine, based on the monitored positions, if the user will collide with one of the objects in the physical environment, and provide instructions to display a warning overlaying a rendering of the physical environment.

According to some embodiments, the at least one camera may be further configured to monitor, in real-time, a real world object in the physical environment, and the orientation and position determination module may be further configured to generate a 3D model of the physical environment, the 3D model including a position of the real world object, and provide instructions to display a virtual object at the position in the rendering of the physical environment.

According to some embodiments, the housing may comprise a detachable back plate to enclose the first strap inside the housing, when the apparatus is folded.

According to some embodiments, the apparatus may further comprise a second strap attached to the housing and configured to attach the housing to a head of a user of the apparatus, when the apparatus is unfolded, and attach the back plate to the housing to fold the apparatus.

According to some embodiments, at least one of the back plate or the first strap may comprise a battery and at least one of a charging contact point or a wireless charging receiving circuit to charge the battery.

According to some embodiments, the apparatus may further comprise a mobile phone fixture to hold a mobile phone inside the housing.

According to some embodiments, the housing may comprise a foldable face support attached to the housing and a foldable face cushion attached to the foldable face support, wherein the foldable face cushion in configured to lean the housing against the user's face.

According to some embodiments, the foldable face support may comprise a spring support.

According to some embodiments, the foldable face support may be a bendable material.

According to some embodiments, the foldable face support may be inflated by a micro air-pump, when the apparatus is unfolded, and the foldable face support may be deflated by the micro air-pump, when the apparatus is folded.

According to some embodiments, the apparatus may further comprise at least one of a gyroscope, an accelerometer, or a magnetometer, held by the housing.

According to some embodiments, the apparatus may further comprise a hand gesture determination module configured to detect a hand gesture from the acquired image and held by the housing.

According to some embodiments, the housing may comprise a front plate, the front plate comprising openings.

According to some embodiments, the apparatus may further comprise at least two cameras and an infrared emitter held by the housing, the at least two cameras and the infrared emitter monitoring the physical environment through the openings.

According to some embodiments, the apparatus may further comprise at least two lenses corresponding to the two cameras.

According to some embodiments, the apparatus may further comprise a slider configured to adjust at least one of a distance between the at least two cameras, a distance between the openings, or a distance between the at least two lenses, to match with the user's inter-pupil distances.

According to some embodiments, the apparatus may further comprise a display screen to display the rendering of the physical environment.

According to some embodiments, the apparatus may further comprises a focus adjustment knob configured to adjust a distance between the at least two lenses and the display screen.

According to some embodiments, the housing may further comprise a decoration plate to cover the openings, when the apparatus is not in use.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

Reference will now be made to the accompanying drawings showing example embodiments of the present application, and in which:

FIGS. 4A-4F are schematic diagrams of exemplary camera systems for supporting immersive and interactive multimedia generation, consistent with embodiments of the present disclosure.

FIG. 11 is a graphical illustration of steps unfolding an exemplary head-mount interactive immersive multimedia generation system, consistent with embodiments of the present disclosure.

DETAILED DESCRIPTION

Reference will now be made in detail to the embodiments, the examples of which are illustrated in the accompanying drawings. Whenever possible, the same reference numbers will be used throughout the drawings to refer to the same or like parts.

The description of the embodiments is only exemplary, and is not intended to be limiting.

Figure 1:
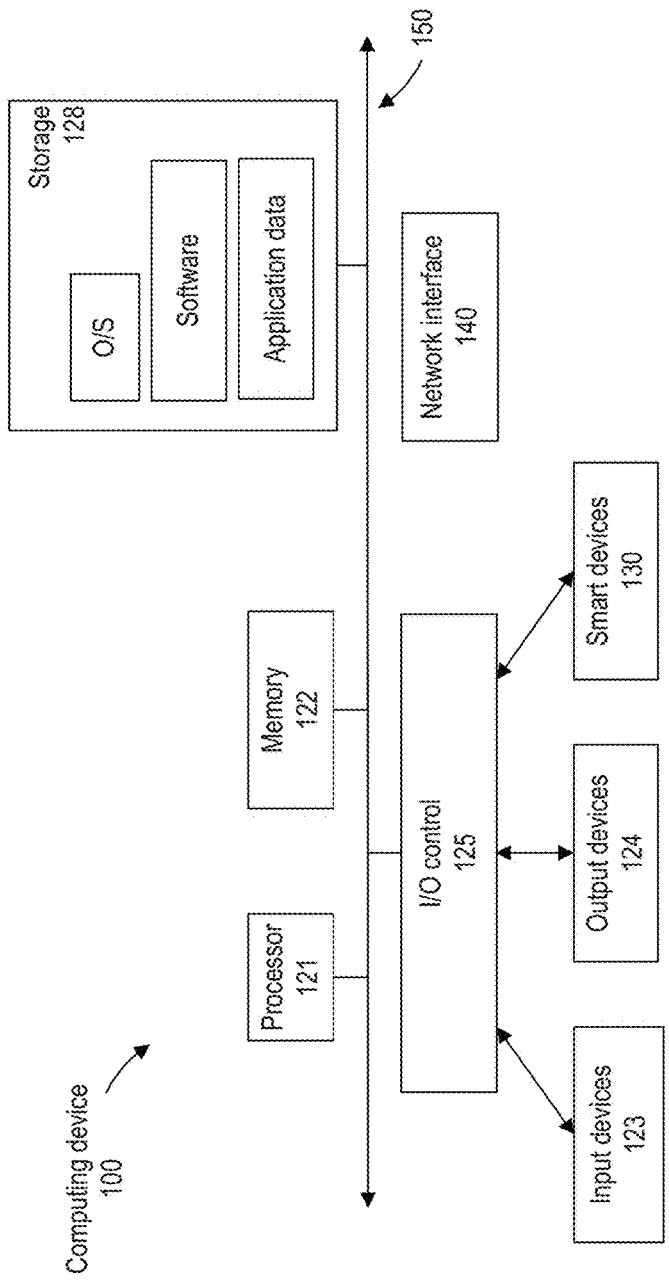
FIG. 1 is a block diagram of an exemplary computing device with which embodiments of the present disclosure can be implemented.

FIG. 1 is a block diagram of an exemplary computing device 100 by which embodiments of the present disclosure can be implemented. As shown in FIG. 1, computing device 100 includes a processor 121 and a main memory 122. Processor 121 can be any logic circuitry that responds to and processes instructions fetched from the main memory 122. Processor 121 can be a single or multiple general-purpose microprocessors, field-programmable gate arrays (FPGAs), or digital signal processors (DSPs) capable of executing instructions stored in a memory (e.g., main memory 122), or an Application Specific Integrated Circuit (ASIC), such that processor 121 is configured to perform a certain task.

Memory 122 includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 122 can be one or more memory chips capable of storing data and allowing any storage location to be directly accessed by processor 121. Main memory 122 can be any type of random access memory (RAM), or any other available memory chip capable of operating as described herein. In the exemplary embodiment shown in FIG. 1, processor 121 communicates with main memory 122 via a system bus 150.

Computing device 100 can further comprise a storage device 128, such as one or more hard disk drives, for storing an operating system and other related software, for storing application software programs, and for storing application data to be used by the application software programs. For example, the application data can include multimedia data, while the software can include a rendering engine configured to render the multimedia data. The software programs can include one or more instructions, which can be fetched to memory 122 from storage 128 to be processed by processor 121. The software programs can include different software modules, which can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules (e.g., in a case where processor 121 is an ASIC), can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, storage 128. Volatile media can include, for example, memory 122. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Computing device 100 can also include one or more input devices 123 and one or more output devices 124. Input device 123 can include, for example, cameras, microphones, motion sensors, etc., while output devices 124 can include, for example, display units and speakers. Both input devices 123 and output devices 124 are connected to system bus 150 through I/O controller 125, enabling processor 121 to communicate with input devices 123 and output devices 124. The communication among processor 121 and input devices 123 and output devices 124 can be performed by, for example, PROCESSOR 121 executing instructions fetched from memory 122.

In some embodiments, processor 121 can also communicate with one or more smart devices 130 via I/O control 125. Smart devices 130 can include a system that includes capabilities of processing and generating multimedia data (e.g., a smart phone). In some embodiments, processor 121 can receive data from input devices 123, fetch the data to smart devices 130 for processing, receive multimedia data (in the form of, for example, audio signal, video signal, etc.) from smart devices 130 as a result of the processing, and then provide the multimedia data to output devices 124. In some embodiments, smart devices 130 can act as a source of multimedia content and provide data related to the multimedia content to processor 121. Processor 121 can then add the multimedia content received from smart devices 130 to output data to be provided to output devices 124. The communication between processor 121 and smart devices 130 can be implemented by, for example, processor 121 executing instructions fetched from memory 122.

In some embodiments, computing device 100 can be configured to generate interactive and immersive multimedia, including virtual reality, augmented reality, or a combination of both. For example, storage 128 can store multimedia data for rendering of graphical images and audio effects for production of virtual reality experience, and processor 121 can be configured to provide at least part of the multimedia data through output devices 124 to produce the virtual reality experience. Processor 121 can also receive data received from input devices 123 (e.g., motion sensors) that enable processor 121 to determine, for example, a change in the location of the user, an action performed by the user (e.g., a body movement), etc. Processor 121 can be configured to, based on the determination, render the multimedia data through output devices 124, to create an interactive experience for the user.

Moreover, computing device 100 can also be configured to provide augmented reality. For example, input devices 123 can include one or more cameras configured to capture graphical images of a physical environment a user is located in, and one or more microphones configured to capture audio signals from the physical environment. Processor 121 can receive data representing the captured graphical images and the audio information from the cameras. Processor 121 can also process data representing additional content to be provided to the user. The additional content can be, for example, information related one or more objects detected from the graphical images of the physical environment. Processor 121 can be configured to render multimedia data that include the captured graphical images, the audio information, as well as the additional content, through output devices 124, to produce an augmented reality experience. The data representing additional content can be stored in storage 128, or can be provided by an external source (e.g., smart devices 130).

Processor 121 can also be configured to create an interactive experience for the user by, for example, acquiring information about a user action, and the rendering of the multimedia data through output devices 124 can be made based on the user action. In some embodiments, the user action can include a change of location of the user, which can be determined by processor 121 based on, for example, data from motion sensors, and tracking of features (e.g., salient features, visible features, objects in a surrounding environment, IR patterns described below, and gestures) from the graphical images. In some embodiments, the user action can also include a hand gesture, which can be determined by processor 121 based on images of the hand gesture captured by the cameras. Processor 121 can be configured to, based on the location information and/or hand gesture information, update the rendering of the multimedia data to create the interactive experience. In some embodiments, processor 121 can also be configured to update the rendering of the multimedia data to enhance the sensing capability of the user by, for example, zooming into a specific location in the physical environment, increasing the volume of audio signal originated from that specific location, etc., based on the hand gesture of the user.

Figure 2B:
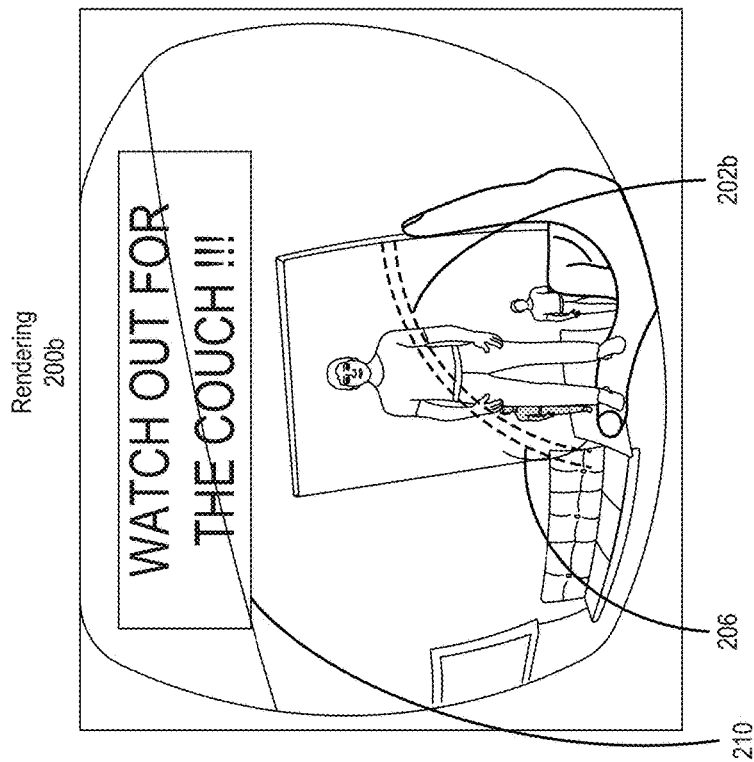
FIGS. 2A-2B are graphical representations of exemplary renderings illustrating immersive multimedia generation, consistent with embodiments of the present disclosure.
Figure 2A:
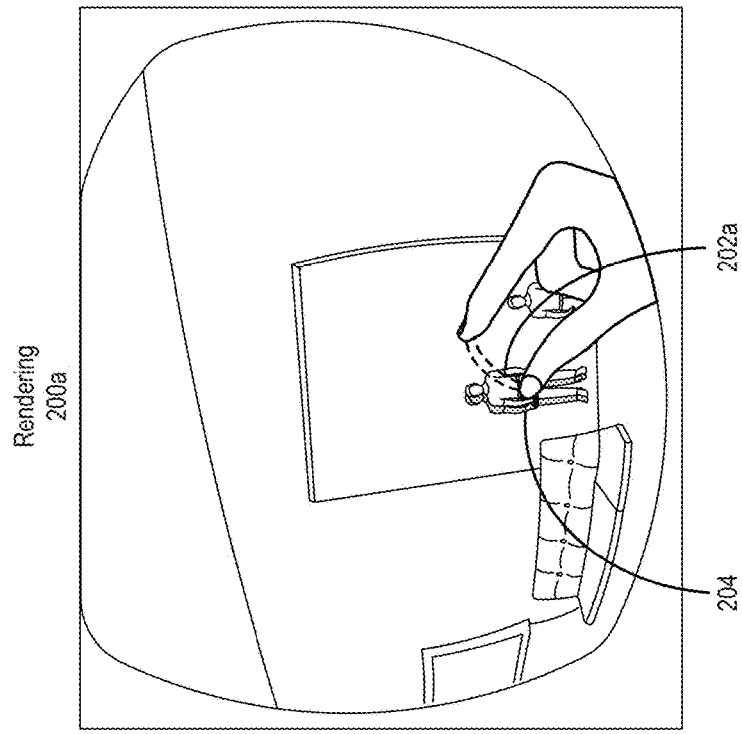

Reference is now made to FIGS. 2A and 2B, which illustrates exemplary multimedia renderings 200a and 200b for providing augmented reality, mixed reality, or super reality consistent with embodiments of the present disclosure. The augmented reality, mixed reality, or super reality may include the following types: 1) collision detection and warning, e.g., overlaying warning information on rendered virtual information, in forms of graphics, texts, or audio, when a virtual content is rendered to a user and the user, while moving round, may collide with a real world object; 2) overlaying a virtual content on top of a real world content; 3) altering a real world view, e.g. making a real world view brighter or more colorful or changing a painting style; and 4) rendering a virtual world based on a real world, e.g., showing virtual objects at positions of real world objects.

As shown in FIGS. 2A and 2B, rendering 200a and 200b reflect a graphical representation of a physical environment a user is located in. In some embodiments, renderings 200a and 200b can be constructed by processor 121 of computing device 100 based on graphical images captured by one or more cameras (e.g., input devices 123). Processor 121 can also be configured to detect a hand gesture from the graphical images, and update the rendering to include additional content related to the hand gesture. As an illustrative example, as shown in FIGS. 2A and 2B, renderings 200a and 200b can include, respectively, dotted lines 202a and 202b that represent a movement of the fingers involved in the creation of the hand gesture. In some embodiments, the detected hand gesture can trigger additional processing of the graphical images to enhance sensing capabilities (e.g., sight) of the user. As an illustrative example, as shown in FIG. 2A, the physical environment rendered in rendering 200a includes an object 204. Object 204 can be selected based on a detection of a first hand gesture, and an overlapping between the movement of the fingers that create the first hand gesture (e.g., as indicated by dotted lines 202a). The overlapping can be determined based on, for example, a relationship between the 3D coordinates of the dotted lines 202a and the 3D coordinates of object 204 in a 3D map that represents the physical environment.

After object 204 is selected, the user can provide a second hand gesture (as indicated by dotted lines 202b), which can also be detected by processor 121. Processor 121 can, based on the detection of the two hand gestures that occur in close temporal and spatial proximity, determine that the second hand gesture is to instruct processor 121 to provide an enlarged and magnified image of object 204 in the rendering of the physical environment. This can lead to rendering 200b, in which image 206, which represents an enlarged and magnified image of object 204, is rendered, together with the physical environment the user is located in. By providing the user a magnified image of an object, thereby allowing the user to perceive more details about the object than he or she would have perceived with naked eyes at the same location within the physical environment, the user's sensory capability can be enhanced. The above is an exemplary process of overlaying a virtual content (the enlarged figure) on top of a real world content (the room setting), altering (enlarging) a real world view, and rendering a virtual world based on a real world (rendering the enlarged FIG. 206 at a position of real world object 204).

In some embodiments, object 204 can also be a virtual object inserted in the rendering of the physical environment, and image 206 can be any image (or just text overlaying on top of the rendering of the physical environment) provided in response to the selection of object 204 and the detection of hand gesture represented by dotted lines 202b.

In some embodiments, processor 121 may build an environment model including an object, e.g. the couch in FIG. 2B, and its location within the model, obtain a position of a user of processor 121 within the environment model, predict where the user's future position and orientation based on a history of the user's movement (e.g. speed and direction), and map the user's positions (e.g. history and predicted positions) into the environment model. Based on the speed and direction of movement of the user as mapped into the model, and the object's location within the model, processor 121 may predict that the user is going to collide with the couch, and display a warning "WATCH OUT FOR THE COUCH !!!" The displayed warning can overlay other virtual and/or real world images rendered in rendering 200b.

Figure 2C:
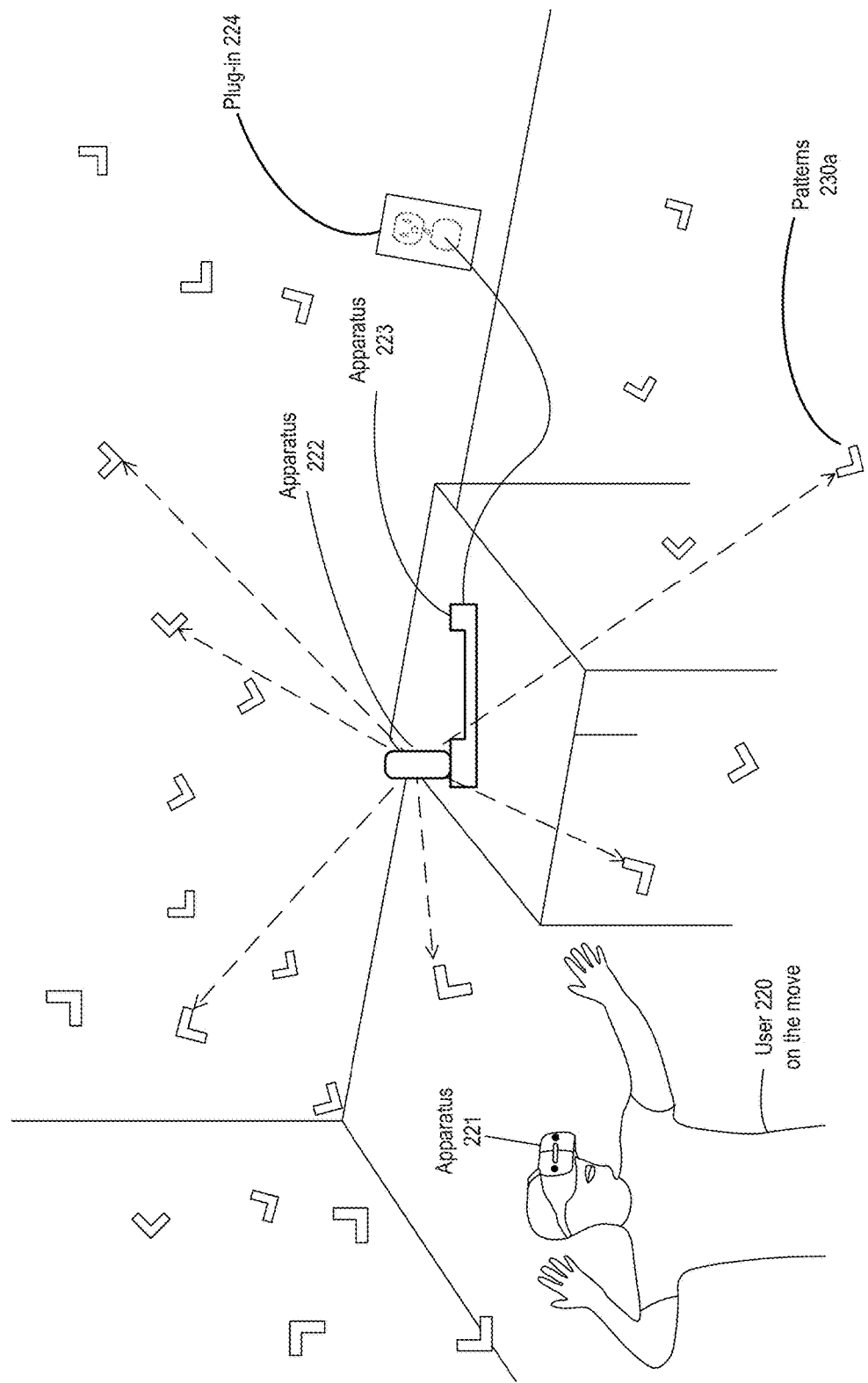
FIG. 2C is a graphical representations of indoor tracking with an IR projector or illuminator, consistent with embodiments of the present disclosure.

FIG. 2C is a graphical representation of indoor tracking with an IR projector, illuminator, or emitter, consistent with embodiments of the present disclosure. As shown in this figure, an immersive and interactive multimedia generation system may comprise an apparatus 221 and an apparatus 222. Apparatus 221 may be worn by user 220 and may include computing device 100, system 330, system 900, or system 1000a described in this disclosure. Apparatus 222 may be an IR projector, illuminator, or emitter, which projects IR patterns 230a onto, e.g., walls, floors, and people in a room. Patterns 230a illustrated in FIG. 2C may be seen under IR detection, e.g. with an IR camera, and may not be visible to naked eyes without such detection. Patterns 230a are further described below with respect to FIGS. 2D and 2E.

Apparatus 222 may be disposed on apparatus 223, and apparatus 223 may be a docking station of apparatus 221 and/or of apparatus 222. Apparatus 222 may be wirelessly charged by apparatus 223 or wired to apparatus 223. Apparatus 222 may also be fixed to any position in the room. Apparatus 223 may be plugged-in to a socket on a wall through plug-in 224.

In some embodiments, as user 220 wearing apparatus 221 moves inside the room illustrated in FIG. 2C, a detector, e.g., a RGB-IR camera or an IR grey scale camera, of apparatus 221 may continuously track the projected IR patterns from different positions and viewpoints of user 220. Based on relative movement of the user to locally fixed IR patterns, a movement (e.g. 3D positions and 3D orientations) of the user (as reflected by the motion of apparatus 221) can be determined based on tracking the IR patterns. Details of the tracking mechanism are described below with respect to method 500 of FIG. 5.

The tracking arrangement of FIG. 2C, where markers (e.g. the IR patterns) are projected onto objects for tracking, may provide certain advantages, when compared with indoor tracking based on visual features. First, an object to be tracked may or may not include visual features that are suitable for tracking. Therefore, by projecting markers with features predesigned for tracking onto these objects, the accuracy and efficiency of tracking can be improved, or at least become more predictable. As an example, the markers can be projected using an IR projector, illuminator, or emitter. These IR markers, invisible to human eyes without IR detection, can server to mark objects without changing the visual perception.

Moreover, since visual features are normally sparse or not well distributed, the lack of available visual features may cause tracking difficult and inaccurate. With IR projection as described, customized IR patterns can be evenly distributed and provide good targets for tracking. Since the IR patterns are fixed, a slight movement of the user can result in a significant change in detection signals, for example, based on a view point change, and accordingly, efficient and robust tracking of the user's indoor position and orientation can be achieved with a low computation cost.

In the above process and as detailed below with respect to method 500 of FIG. 5, since images of the IR patterns are captured by detectors to obtain movements of the user by triangulation steps, depth map generation and/or depth measurement may not be needed in this process. Further, as described below with respect to FIG. 5, since movements of the user are determined based on changes in locations, e.g., reprojected locations, of the IR patterns between images, no prior knowledge of pattern distribution and pattern location are needed for the determination. Therefore, even random patterns can be used to achieve the above results.

In some embodiments, with 3D model generation of the user's environment as described below, relatively positions of the user inside the room and the user's surrounding can be accurately captured and modeled.

Figure 2E:
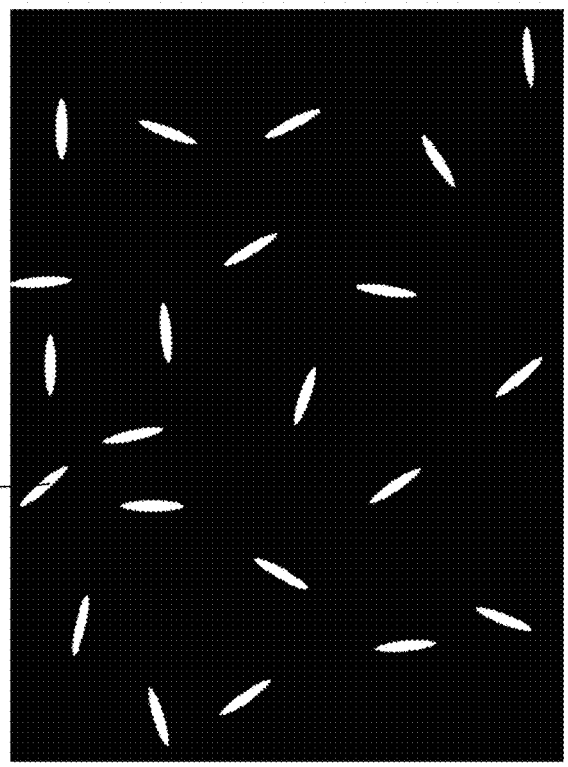
FIGS. 2D-2E are graphical representations of patterns emitted from an IR projector or illuminator, consistent with embodiments of the present disclosure.
Figure 2D:
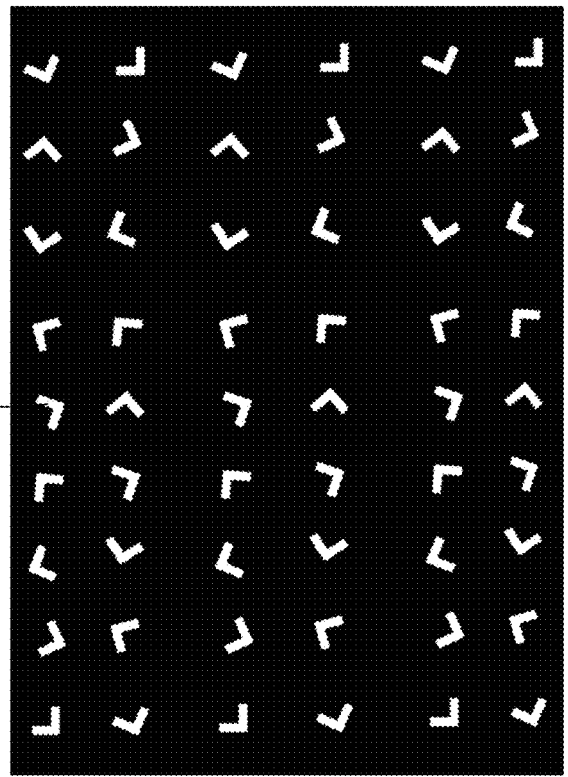

FIGS. 2D-2E are graphical representations of exemplary patterns 230b and 230c emitted from apparatus 222, consistent with embodiments of the present disclosure. The patterns may comprise repeating units as shown in FIGS. 2D-2E. Pattern 230b comprise randomly oriented "L" shape units, which can be more easily recognized and more accurately tracked by a detector, e.g., a RGB-IR camera described below or detectors of various immersive and interactive multimedia generation systems of this disclosure, due to the sharp turning angles and sharp edges, as well as the random orientations. Alternatively, the patterns may comprise non-repeating units. The patterns may also include fixed dot patterns, bar codes, and quick response codes.

Referring back to FIG. 1, in some embodiments computing device 100 can also include a network interface 140 to interface to a LAN, WAN, MAN, or the Internet through a variety of link including, but not limited to, standard telephone lines, LAN or WAN links (e.g., 802.11, T1, T3, 56 kb, X.25), broadband link (e.g., ISDN, Frame Relay, ATM), wireless connections (Wi-Fi, Bluetooth, Z-Wave, Zigbee), or some combination of any or all of the above. Network interface 140 can comprise a built-in network adapter, network interface card, PCMCIA network card, card bus network adapter, wireless network adapter, USB network adapter, modem or any other device suitable for interfacing computing device 100 to any type of network capable of communication and performing the operations described herein. In some embodiments, processor 121 can transmit the generated multimedia data not only to output devices 124 but also to other devices (e.g., another computing device 100 or a mobile device) via network interface 140.

Figure 3:
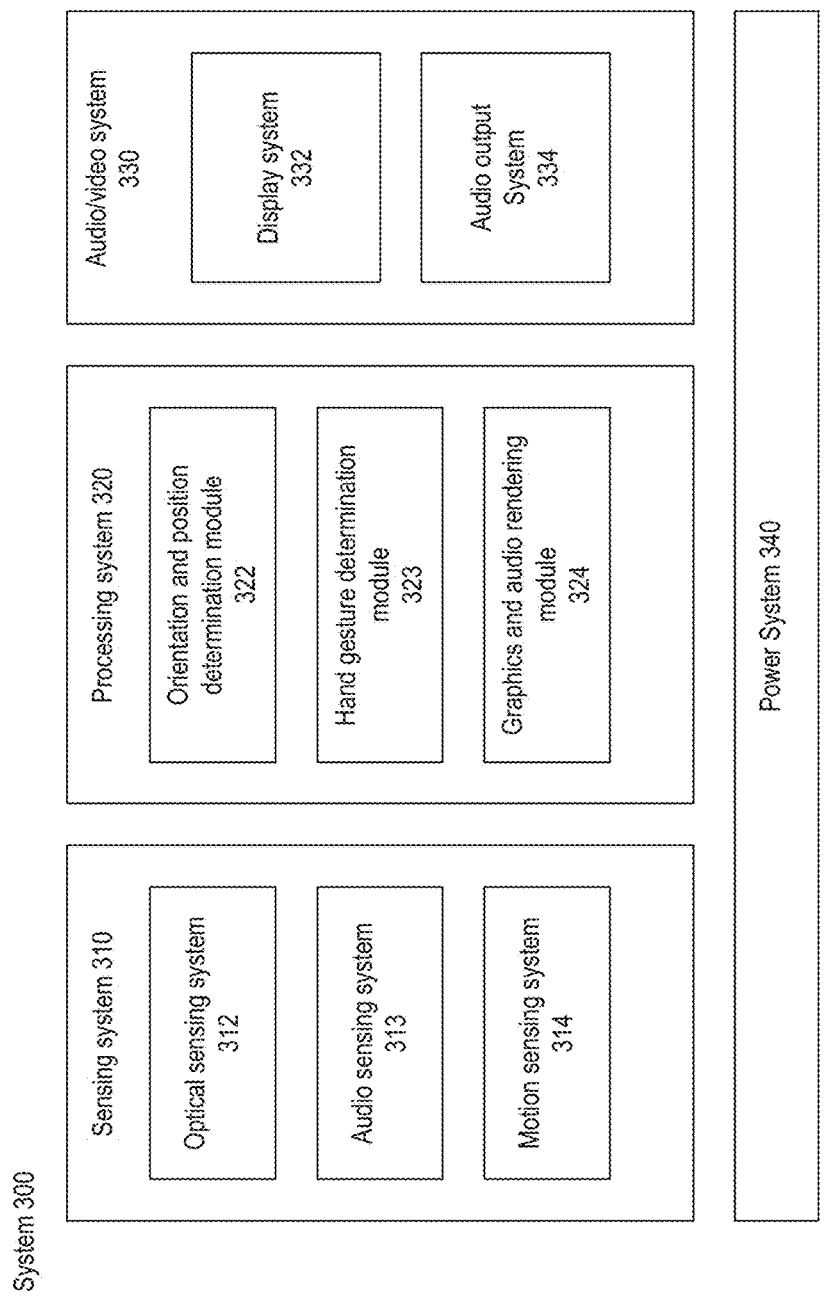
FIG. 3 is a block diagram of an exemplary system for immersive and interactive multimedia generation, consistent with embodiments of the present disclosure.

FIG. 3 is a block diagram of an exemplary system 300 for immersive and interactive multimedia generation, consistent with embodiments of the present disclosure. As shown in FIG. 3, system 300 includes a sensing system 310, processing system 320, an audio/video system 330, and a power system 340. In some embodiments, at least part of system 300 is implemented with computing device 100 of FIG. 1.

In some embodiments, sensing system 310 is configured to provide data for generation of interactive and immersive multimedia. Sensing system 310 includes an image sensing system 312, an audio sensing system 313, and a motion sensing system 314.

In some embodiments, optical sensing system 312 can be configured to receive lights of various wavelengths (including both visible and invisible lights) reflected or emitted from a physical environment. In some embodiments, optical sensing system 312 includes, for example, one or more grayscale-infra-red (grayscale IR) cameras, one or more red-green-blue (RGB) cameras, one or more RGB-IR cameras, one or more time-of-flight (TOF) cameras, or a combination of them. Based on the output of the cameras, system 300 can acquire image data of the physical environment (e.g., represented in the form of RGB pixels and IR pixels). Optical sensing system 312 can include a pair of identical cameras (e.g., a pair of RGB cameras, a pair of IR cameras, a pair of RGB-IR cameras, etc.), which each camera capturing a viewpoint of a left eye or a right eye. As to be discussed below, the image data captured by each camera can then be combined by system 300 to create a stereoscopic 3D rendering of the physical environment.

In some embodiments, optical sensing system 312 can include an IR projector, an IR illuminator, or an IR emitter configured to illuminate the object. The illumination can be used to support range imaging, which enables system 300 to determine, based also on stereo matching algorithms, a distance between the camera and different parts of an object in the physical environment. Based on the distance information, a three-dimensional (3D) depth map of the object, as well as a 3D map of the physical environment, can be created. As to be discussed below, the depth map of an object can be used to create 3D point clouds that represent the object; the RGB data of an object, as captured by the RGB camera, can then be mapped to the 3D point cloud to create a 3D rendering of the object for producing the virtual reality and augmented reality effects. On the other hand, the 3D map of the physical environment can be used for location and orientation determination to create the interactive experience. In some embodiments, a time-of-flight camera can also be included for range imaging, which allows the distance between the camera and various parts of the object to be determined, and depth map of the physical environment can be created based on the distance information.

In some embodiments, the IR projector or illuminator is also configured to project certain patterns (e.g., bar codes, corner patterns, etc.) onto one or more surfaces of the physical environment. As described above with respect to FIGS. 2C-2E, the IR projector or illuminator may be fixed to a position, e.g. a position inside a room to emitted patterns toward an interior of the room. As described below with respect to FIGS. 4A-4F, the IR projector or illuminator may be a part of a camera system worn by a user and emit pattern while moving with the user. In either embodiment or example above, a motion of the user (as reflected by the motion of the camera) can be determined by tracking various salient feature points captured by the camera, and the projection of known patterns (which are then captured by the camera and tracked by the system) enables efficient and robust tracking.

Reference is now made to FIGS. 4A-4F, which are schematic diagrams illustrating, respectively, exemplary camera systems 400, 420, 440, 460, 480, and 494 consistent with embodiments of the present disclosure. Each camera system of FIGS. 4A-4F can be part of optical sensing system 312 of FIG. 3. IR illuminators described below may be optional.

Figure 4A:
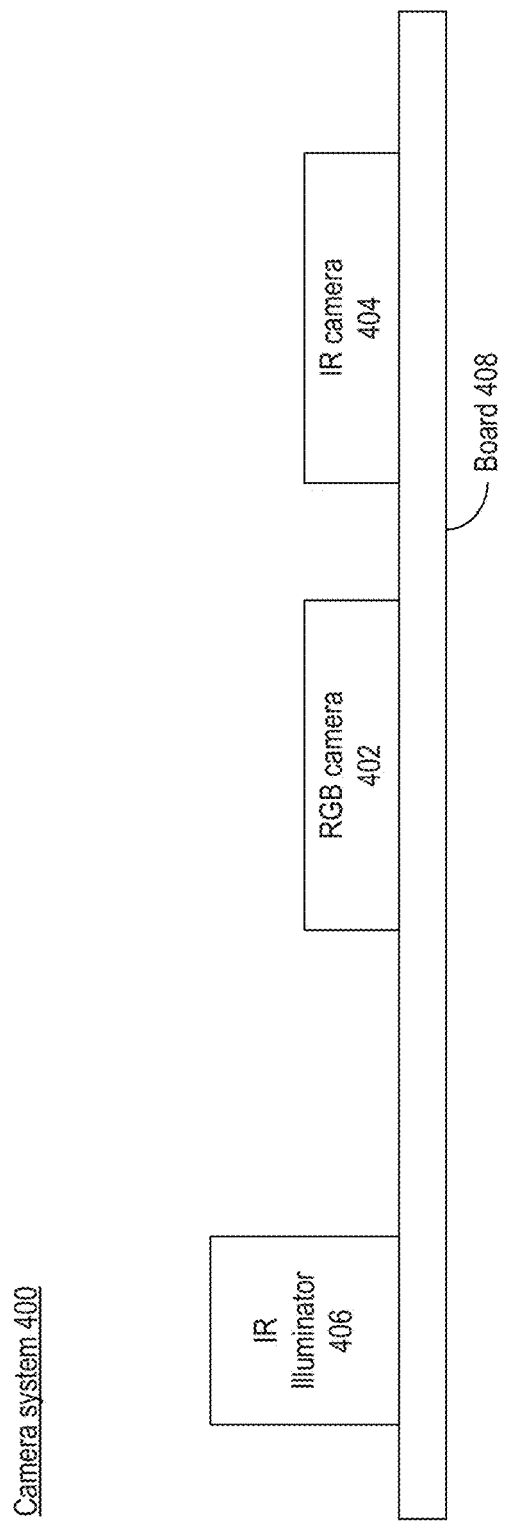

As shown in FIG. 4A, camera system 400 includes RGB camera 402, IR camera 404, and an IR illuminator 406, all of which are attached onto a board 408. IR illuminator 406 and similar components describe below may include an IR laser light projector or a light emitting diode (LED). As discussed above, RGB camera 402 is configured to capture RGB image data, IR camera 404 is configured to capture IR image data, while a combination of IR camera 404 and IR illuminator 406 can be used to create a depth map of an object being imaged. As discussed before, during the 3D rendering of the object, the RGB image data can be mapped to a 3D point cloud representation of the object created from the depth map. However, in some cases, due to a positional difference between the RGB camera and the IR camera, not all of the RGB pixels in the RGB image data can be mapped to the 3D point cloud. As a result, inaccuracy and discrepancy can be introduced in the 3D rendering of the object. In some embodiments, the IR illuminator or projector or similar components in this disclosure may be independent, e.g. being detached from board 408 or being independent from system 900 or circuit board 950 of FIGS. 9A and 9B as described below. For example, the IR illuminator or projector or similar components can be integrated into a charger or a docking station of system 900, and can be wirelessly powered, battery-powered, or plug-powered.

FIG. 4B illustrates a camera system 420, which includes an RGB-IR camera 422 and an IR illuminator 424, all of which are attached onto a board 426. RGB-IR camera 442 includes a RGB-IR sensor which includes RGB and IR pixel sensors mingled together to form pixel groups. With RGB and IR pixel sensors substantially col-located, the aforementioned effects of positional difference between the RGB and IR sensors can be eliminated. However, in some cases, due to overlap of part of the RGB spectrum and part of the IR spectrum, having RGB and IR pixel sensors co-located can lead to degradation of color production of the RGB pixel sensors as well as color image quality produced by the RGB pixel sensors.

FIG. 4C illustrates a camera system 440, which includes an IR camera 442, a RGB camera 444, a mirror 446 (e.g. a beam-splitter), and an IR illuminator 448, all of which can be attached to board 450. In some embodiments, mirror 446 may include an IR reflective coating 452. As light (including visual light, and IR light reflected by an object illuminated by IR illuminator 448) is incident on mirror 446, the IR light can be reflected by mirror 446 and captured by IR camera 442, while the visual light can pass through mirror 446 and be captured by RGB camera 444. IR camera 442, RGB camera 444, and mirror 446 can be positioned such that the IR image captured by IR camera 442 (caused by the reflection by the IR reflective coating) and the RGB image captured by RGB camera 444 (from the visible light that passes through mirror 446) can be aligned to eliminate the effect of position difference between IR camera 442 and RGB camera 444. Moreover, since the IR light is reflected away from RGB camera 444, the color product as well as color image quality produced by RGB camera 444 can be improved.

FIG. 4D illustrates a camera system 460 that includes RGB camera 462, TOF camera 464, and an IR illuminator 466, all of which are attached onto a board 468. Similar to camera systems 400, 420, and 440, RGB camera 462 is configured to capture RGB image data. On the other hand, TOF camera 464 and IR illuminator 406 are synchronized to perform image-ranging, which can be used to create a depth map of an object being imaged, from which a 3D point cloud of the object can be created. Similar to camera system 400, in some cases, due to a positional difference between the RGB camera and the TOF camera, not all of the RGB pixels in the RGB image data can be mapped to the 3D point cloud created based on the output of the TOF camera. As a result, inaccuracy and discrepancy can be introduced in the 3D rendering of the object.

FIG. 4E illustrates a camera system 480, which includes a TOF camera 482, a RGB camera 484, a mirror 486 (e.g. a beam-splitter), and an IR illuminator 488, all of which can be attached to board 490. In some embodiments, mirror 486 may include an IR reflective coating 492. As light (including visual light, and IR light reflected by an object illuminated by IR illuminator 488) is incident on mirror 486, the IR light can be reflected by mirror 486 and captured by TOF camera 482, while the visual light can pass through mirror 486 and be captured by RGB camera 484. TOF camera 482, RGB camera 484, and mirror 486 can be positioned such that the IR image captured by TOF camera 482 (caused by the reflection by the IR reflective coating) and the RGB image captured by RGB camera 484 (from the visible light that passes through mirror 486) can be aligned to eliminate the effect of position difference between TOF camera 482 and RGB camera 484. Moreover, since the IR light is reflected away from RGB camera 484, the color product as well as color image quality produced by RGB camera 484 can also be improved.

Figure 4F:
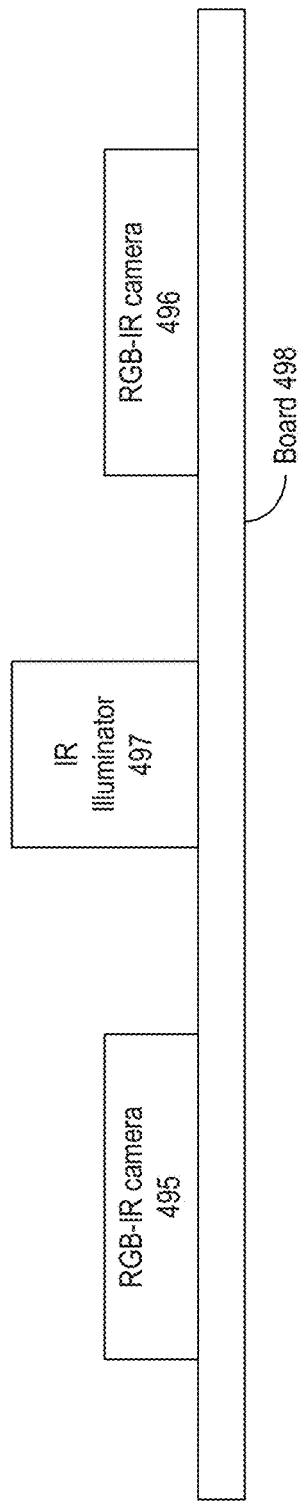

FIG. 4F illustrates a camera system 494, which includes two RGB-IR cameras 495 and 496, with each configured to mimic the view point of a human eye. A combination of RGB-IR cameras 495 and 496 can be used to generate stereoscopic images and to generate depth information of an object in the physical environment, as to be discussed below. Since each of the cameras have RGB and IR pixels co-located, the effect of positional difference between the RGB camera and the IR camera that leads to degradation in pixel mapping can be mitigated. Camera system 494 further includes an IR illuminator 497 with similar functionalities as other IR illuminators discussed above. As shown in FIG. 4F, RGB-IR cameras 495 and 496 and IR illuminator 497 are attached to board 498.

In some embodiments with reference to camera system 494, a RGB-IR camera can be used for the following advantages over a RGB-only or an IR-only camera. A RGB-IR camera can capture RGB images to add color information to depth images to render 3D image frames, and can capture IR images for object recognition and tracking, including 3D hand tracking. On the other hand, conventional RGB-only cameras may only capture a 2D color photo, and IR-only cameras under IR illumination may only capture grey scale depth maps. Moreover, with the IR illuminator emitter texture patterns towards a scene, signals captured by the RBG-IR camera can be more accurate and can generate more precious depth images. Further, the captured IR images can also be used for generating the depth images using a stereo matching algorithm based on gray images. The stereo matching algorithm may use raw image data from the RGB-IR cameras to generate depth maps. The raw image data may include both information in a visible RGB range and an IR range with added textures by the laser projector.

By combining the camera sensors' both RGB and IR information and with the IR illumination, the matching algorithm may resolve the objects' details and edges, and may overcome a potential low-texture-information problem. The low-texture-information problem may occur, because although visible light alone may render objects in a scene with better details and edge information, it may not work for areas with low texture information. While IR projection light can add texture to the objects to supply the low texture information problem, in an indoor condition, there may not be enough ambient IR light to light up objects to render sufficient details and edge information.

Referring back to FIG. 3, sensing system 310 also includes audio sensing system 313 and motion sensing system 314. Audio sensing system 313 can be configured to receive audio signals originated from the physical environment. In some embodiments, audio sensing system 313 includes, for example, one or more microphone arrays. Motion sensing system 314 can be configured to detect a motion and/or a pose of the user (and of the system, if the system is attached to the user). In some embodiments, motion sensing system 314 can include, for example, inertial motion sensor (IMU). In some embodiments, sensing system 310 can be part of input devices 123 of FIG. 1.

In some embodiments, processing system 320 is configured to process the graphical image data from optical sensing system 312, the audio data from audio sensing system 313, and motion data from motion sensing system 314, and to generate multimedia data for rendering the physical environment to create the virtual reality and/or augmented reality experiences. Processing system 320 includes an orientation and position determination module 322, a hand gesture determination system module 323, and a graphics and audio rendering engine module 324. As discussed before, each of these modules can be software modules being executed by a processor (e.g., processor 121 of FIG. 1), or hardware modules (e.g., ASIC) configured to perform specific functions.

In some embodiments, orientation and position determination module 322 can determine an orientation and a position of the user based on at least some of the outputs of sensing system 310, based on which the multimedia data can be rendered to produce the virtual reality and/or augmented reality effects. In a case where system 300 is worn by the user (e.g., a goggle), orientation and position determination module 322 can determine an orientation and a position of part of the system (e.g., the camera), which can be used to infer the orientation and position of the user. The orientation and position determined can be relative to prior orientation and position of the user before a movement occurs.

Figure 5:
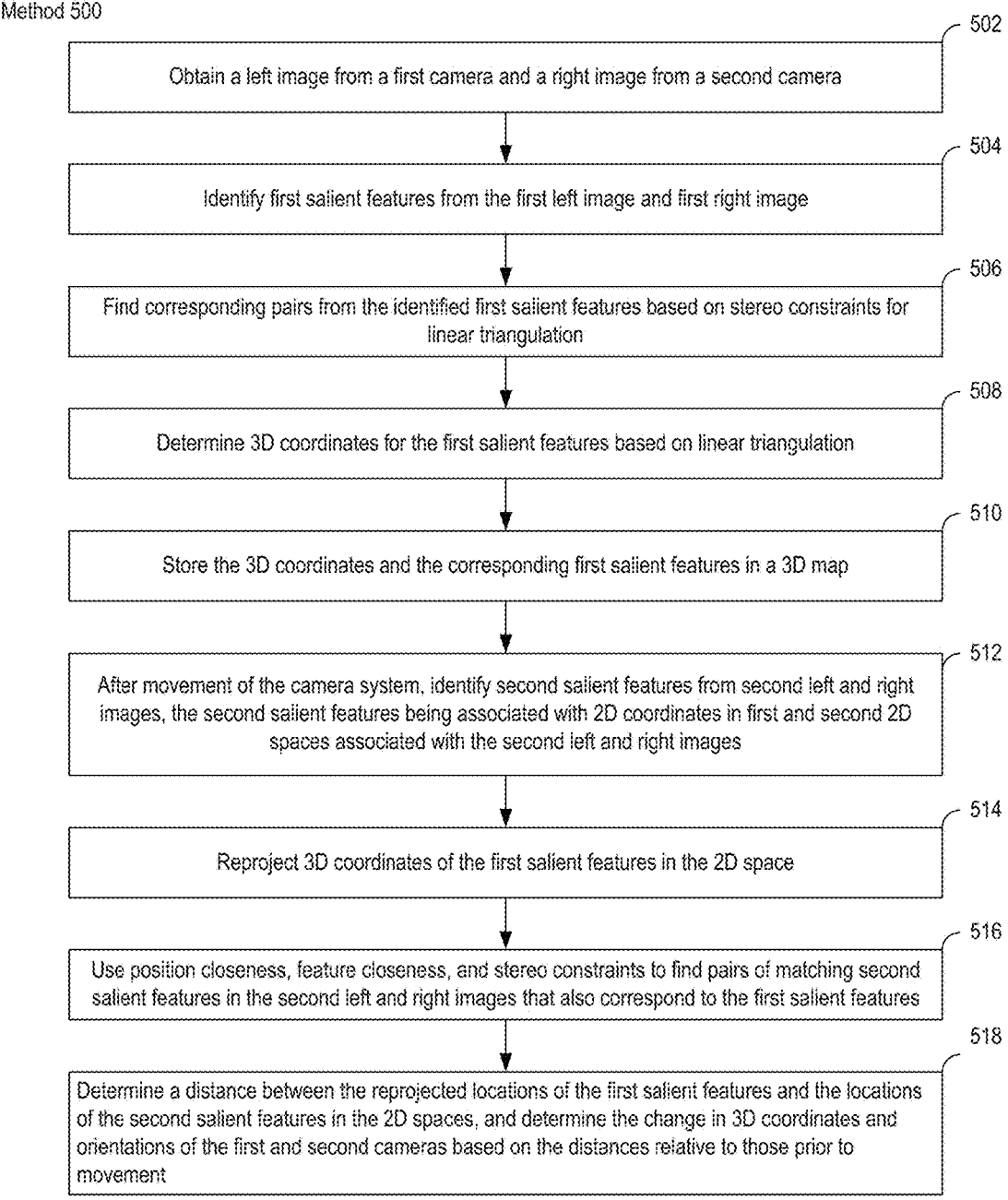
FIG. 5 is a flowchart of an exemplary method for sensing the location and pose of a camera to support immersive and interactive multimedia generation, consistent with embodiments of the present disclosure.

Reference is now made to FIG. 5, which is a flowchart that illustrates an exemplary method 500 for determining an orientation and a position of a pair cameras (e.g., of sensing system 310) consistent with embodiments of the present disclosure. It will be readily appreciated that the illustrated procedure can be altered to delete steps or further include additional steps. While method 500 is described as being performed by a processor (e.g., orientation and position determination module 322), it is appreciated that method 500 can be performed by other devices alone or in combination with the processor.

In step 502, the processor can obtain a first left image from a first camera and a first right image from a second camera. The left camera can be, for example, RGB-IR camera 495 of FIG. 4F, while the right camera can be, for example, RGB-IR camera 496 of FIG. 4F. The first left image can represent a viewpoint of a physical environment from the left eye of the user, while the first right image can represent a viewpoint of the physical environment from the right eye of the user. Both images can be IR image, RGB image, or a combination of both (e.g., RGB-IR).

In step 504, the processor can identify a set of first salient feature points from the first left image and from the right image. In some cases, the salient features can be physical features that are pre-existing in the physical environment (e.g., specific markings on a wall, features of clothing, etc.), and the salient features are identified based on RGB pixels and/or IR pixels associated with these features. In some cases, the salient features can be identified by an IR illuminator (e.g., IR illuminator 497 of FIG. 4F) that projects specific IR patterns (e.g., dots) onto one or more surfaces of the physical environment. The one or more surfaces can reflect the IR back to the cameras and be identified as the salient features. As discussed before, those IR patterns can be designed for efficient detection and tracking, such as being evenly distributed and include sharp edges and corners. In some cases, the salient features can be identified by placing one or more IR projectors that are fixed at certain locations within the physical environment and that project the IR patterns within the environment.

In step 506, the processor can find corresponding pairs from the identified first salient features (e.g., visible features, objects in a surrounding environment, IR patterns described above, and gestures) based on stereo constraints for triangulation. The stereo constraints can include, for example, limiting a search range within each image for the corresponding pairs of the first salient features based on stereo properties, a tolerance limit for disparity, etc. The identification of the corresponding pairs can be made based on the IR pixels of candidate features, the RGB pixels of candidate features, and/or a combination of both. After a corresponding pair of first salient features is identified, their location differences within the left and right images can be determined. Based on the location differences and the distance between the first and second cameras, distances between the first salient features (as they appear in the physical environment) and the first and second cameras can be determined via linear triangulation.

In step 508, based on the distance between the first salient features and the first and second cameras determined by linear triangulation, and the location of the first salient features in the left and right images, the processor can determine one or more 3D coordinates of the first salient features.

In step 510, the processor can add or update, in a 3D map representing the physical environment, 3D coordinates of the first salient features determined in step 508 and store information about the first salient features. The updating can be performed based on, for example, a simultaneous location and mapping algorithm (SLAM). The information stored can include, for example, IR pixels and RGB pixels information associated with the first salient features.

In step 512, after a movement of the cameras (e.g., caused by a movement of the user who carries the cameras), the processor can obtain a second left image and a second right image, and identify second salient features from the second left and right images. The identification process can be similar to step 504. The second salient features being identified are associated with 2D coordinates within a first 2D space associated with the second left image and within a second 2D space associated with the second right image. In some embodiments, the first and the second salient features may be captured from the same object at different viewing angles.

In step 514, the processor can reproject the 3D coordinates of the first salient features (determined in step 508) into the first and second 2D spaces.

In step 516, the processor can identify one or more of the second salient features that correspond to the first salient features based on, for example, position closeness, feature closeness, and stereo constraints.

In step 518, the processor can determine a distance between the reprojected locations of the first salient features and the 2D coordinates of the second salient features in each of the first and second 2D spaces. The relative 3D coordinates and orientations of the first and second cameras before and after the movement can then be determined based on the distances such that, for example, the set of 3D coordinates and orientations thus determined minimize the distances in both of the first and second 2D spaces.

In some embodiments, method 500 further comprises a step (not shown in FIG. 5) in which the processor can perform bundle adjustment of the coordinates of the salient features in the 3D map to minimize the location differences of the salient features between the left and right images. The adjustment can be performed concurrently with any of the steps of method 500, and can be performed only on key frames.

In some embodiments, method 500 further comprises a step (not shown in FIG. 5) in which the processor can generate a 3D model of a user's environment based on a depth map and the SLAM algorithm. The depth map can be generated by the combination of stereo matching and IR projection described above with reference to FIG. 4F. The 3D model may include positions of real world objects. By obtaining the 3D model, virtual objects can be rendered at precious and desirable positions associated with the real world objects. For example, if a 3D model of a fish tank is determined from a user's environment, virtual fish can be rendered at reasonable positions within a rendered image of the fish tank.

In some embodiments, the processor can also use data from our input devices to facilitate the performance of method 500. For example, the processor can obtain data from one or more motion sensors (e.g., motion sensing system 314), from which processor can determine that a motion of the cameras has occurred. Based on this determination, the processor can execute step 512. In some embodiments, the processor can also use data from the motion sensors to facilitate calculation of a location and an orientation of the cameras in step 518.

Referring back to FIG. 3, processing system 320 further includes a hand gesture determination module 323. In some embodiments, hand gesture determination module 323 can detect hand gestures from the graphical image data from optical sensing system 312, if system 300 does not generate a depth map. The techniques of hand gesture information are related to those described in U.S. application Ser. No. 14/034,286, filed Sep. 23, 2013, and U.S. application Ser. No. 14/462,324, filed Aug. 18, 2014. The above-referenced applications are incorporated herein by reference. If system 300 generates a depth map, hand tracking may be realized based on the generated depth map. The hand gesture information thus determined can be used to update the rendering (both graphical and audio) of the physical environment to provide additional content and/or to enhance sensory capability of the user, as discussed before in FIGS. 2A-B. For example, in some embodiments, hand gesture determination module 323 can determine an interpretation associated with the hand gesture (e.g., to select an object for zooming in), and then provide the interpretation and other related information to downstream logic (e.g., graphics and audio rendering module 324) to update the rendering.

Figure 6:
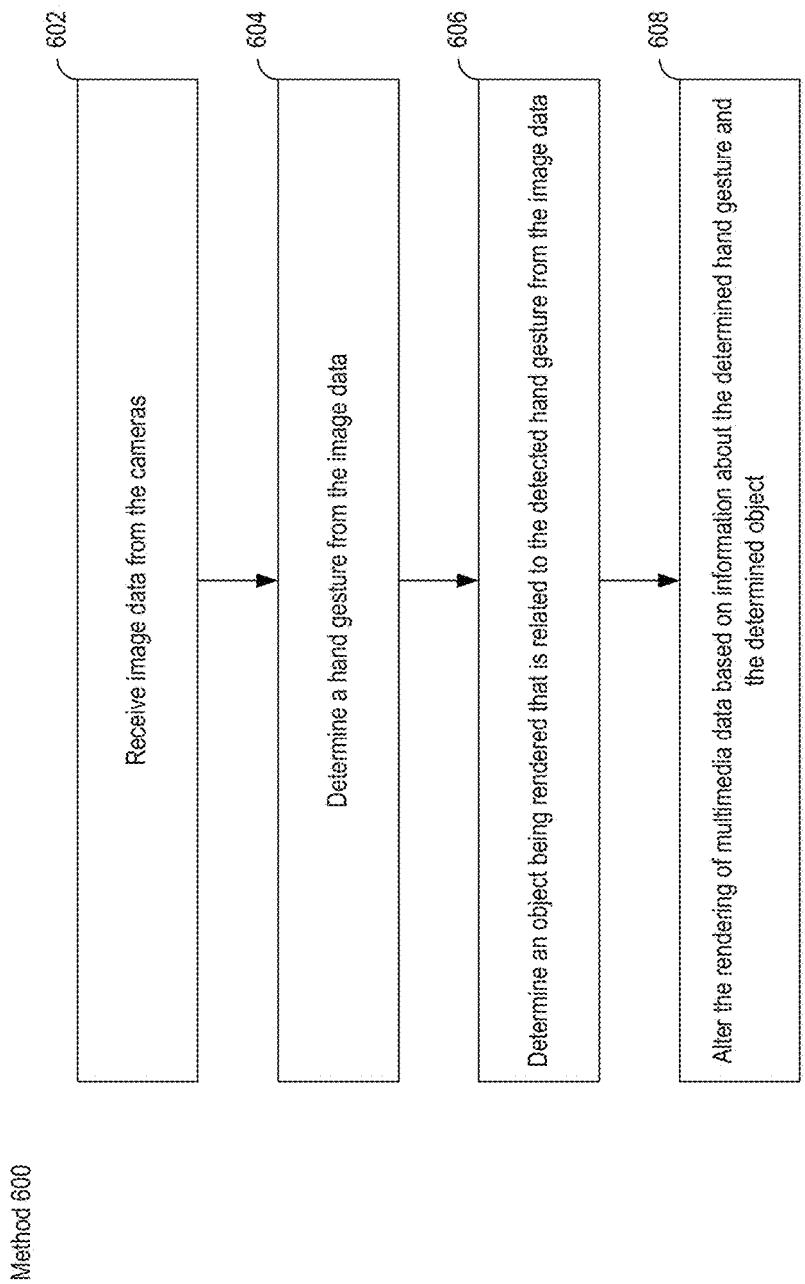
FIG. 6 is a flowchart of an exemplary method for updating multimedia rendering based on hand gesture, consistent with embodiments of the present disclosure.

Reference is now made to FIG. 6, which is a flowchart that illustrates an exemplary method 600 for updating multimedia rendering based on detected hand gesture consistent with embodiments of the present disclosure. It will be readily appreciated that the illustrated procedure can be altered to delete steps or further include additional steps. While method 600 is described as being performed by a processor (e.g., hand gesture determination module 323), it is appreciated that method 600 can be performed by other devices alone or in combination with the processor.

In step 602, the processor can receive image data from one or more cameras (e.g., of optical sensing system 312). In a case where the cameras are gray-scale IR cameras, the processor can obtain the IR camera images. In a case where the cameras are RGB-IR cameras, the processor can obtain the IR pixel data.

In step 604, the processor can determine a hand gesture from the image data based on the techniques discussed above. The determination also includes determination of both a type of hand gesture (which can indicate a specific command) and the 3D coordinates of the trajectory of the fingers (in creating the hand gesture).

In step 606, the processor can determine an object, being rendered as a part of immersive multimedia data, that is related to the detected hand gesture. For example, in a case where the hand gesture signals a selection, the rendered object that is being selected by the hand gesture is determined. The determination can be based on a relationship between the 3D coordinates of the trajectory of hand gesture and the 3D coordinates of the object in a 3D map which indicates that certain part of the hand gesture overlaps with at least a part of the object within the user's perspective.

In step 608, the processor can, based on information about the hand gesture determined in step 604 and the object determined in step 606, alter the rendering of the multimedia data. As an illustrative example, based on a determination that the hand gesture detected in step 604 is associated with a command to select an object (whether it is a real object located in the physical environment, or a virtual object inserted in the rendering) for a zooming action, the processor can provide a magnified image of the object to downstream logic (e.g., graphics and audio rendering module 324) for rendering. As another illustrative example, if the hand gesture is associated with a command to display additional information about the object, the processor can provide the additional information to graphics and audio rendering module 324 for rendering.

Referring back to FIG. 3, based on information about an orientation and a position of the camera (provided by, for example, orientation and position determination module 322) and information about a detected hand gesture (provided by, for example, hand gesture determination module 323), graphics and audio rendering module 324 can render immersive multimedia data (both graphics and audio) to create the interactive virtual reality and/or augmented reality experiences. Various methods can be used for the rendering. In some embodiments, graphics and audio rendering module 324 can create a first 3D mesh (can be either planar or curved) associated with a first camera that captures images for the left eye, and a second 3D mesh (also can be either planar or curved) associated with a second camera that captures images for the right eye. The 3D meshes can be placed at a certain imaginary distance from the camera, and the sizes of the 3D meshes can be determined such that they fit into a size of the camera's viewing frustum at that imaginary distance. Graphics and audio rendering module 324 can then map the left image (obtained by the first camera) to the first 3D mesh, and map the right image (obtained by the second camera) to the second 3D mesh. Graphics and audio rendering module 324 can be configured to only show the first 3D mesh (and the content mapped to it) when rendering a scene for the left eye, and to only show the second 3D mesh (and the content mapped to it) when rendering a scene for the right eye.

In some embodiments, graphics and audio rendering module 324 can also perform the rendering using a 3D point cloud. As discussed before, during the determination of location and orientation, depth maps of salient features (and the associated object) within a physical environment can be determined based on IR pixel data. 3D point clouds of the physical environment can then be generated based on the depth maps. Graphics and audio rendering module 324 can map the RGB pixel data of the physical environment (obtained by, e.g., RGB cameras, or RGB pixels of RGB-IR sensors) to the 3D point clouds to create a 3D rendering of the environment.

Figure 7:
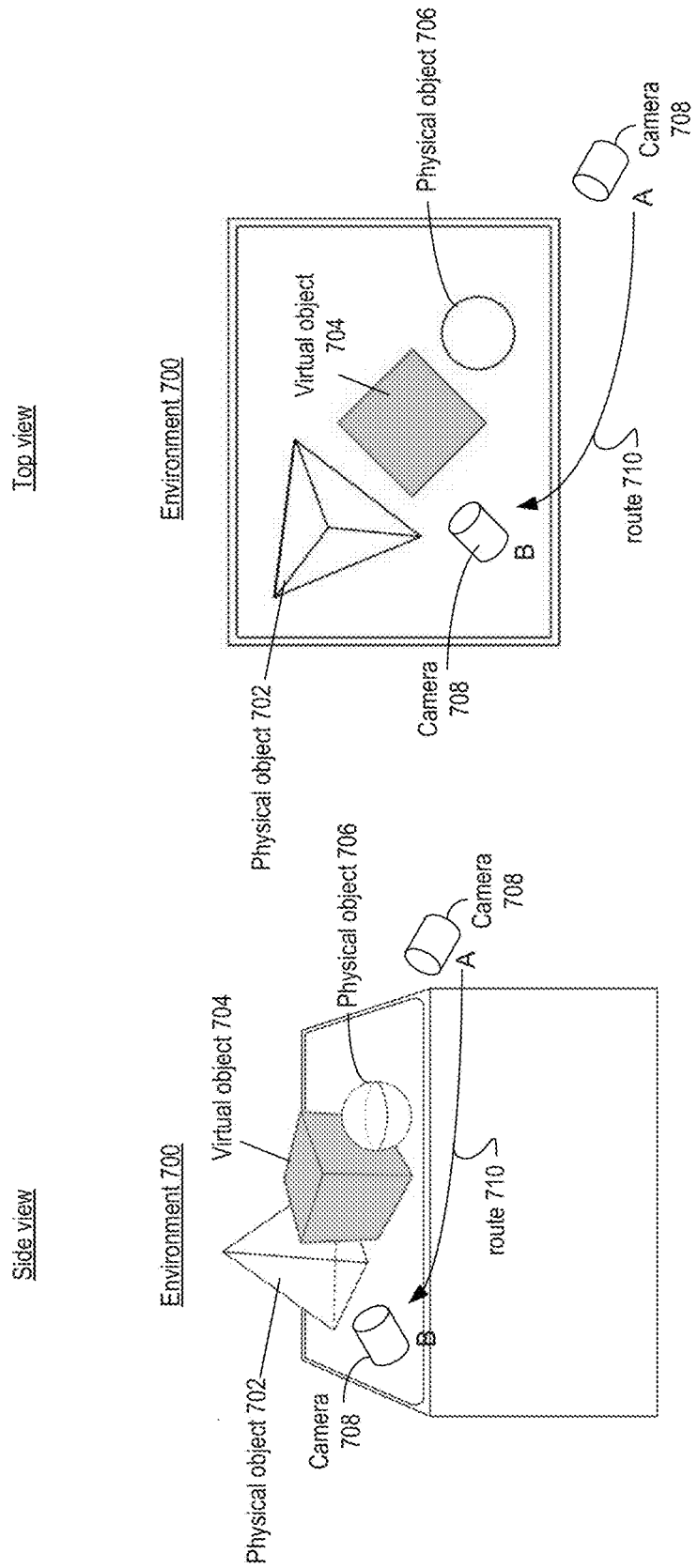
FIGS. 7A-7B are illustrations of blending of an image of 3D virtual object into real-time graphical images of a physical environment, consistent with embodiments of the present disclosure.

In some embodiments, in a case where images of a 3D virtual object is to be blended with real-time graphical images of a physical environment, graphics and audio rendering module 324 can be configured to determine the rendering based on the depth information of the virtual 3D object and the physical environment, as well as a location and an orientation of the camera. Reference is now made to FIGS. 7A and 7B, which illustrate the blending of an image of 3D virtual object into real-time graphical images of a physical environment, consistent with embodiments of the present disclosure. As shown in FIG. 7A, environment 700 includes a physical object 702 and a physical object 706. Graphics and audio rendering module 324 is configured to insert virtual object 704 between physical object 702 and physical object 706 when rendering environment 700. The graphical images of environment 700 are captured by camera 708 along route 710 from position A to position B. At position A, physical object 706 is closer to camera 708 relative to virtual object 704 within the rendered environment, and obscures part of virtual object 704, while at position B, virtual object 704 is closer to camera 708 relative to physical object 706 within the rendered environment.

Figure 8:
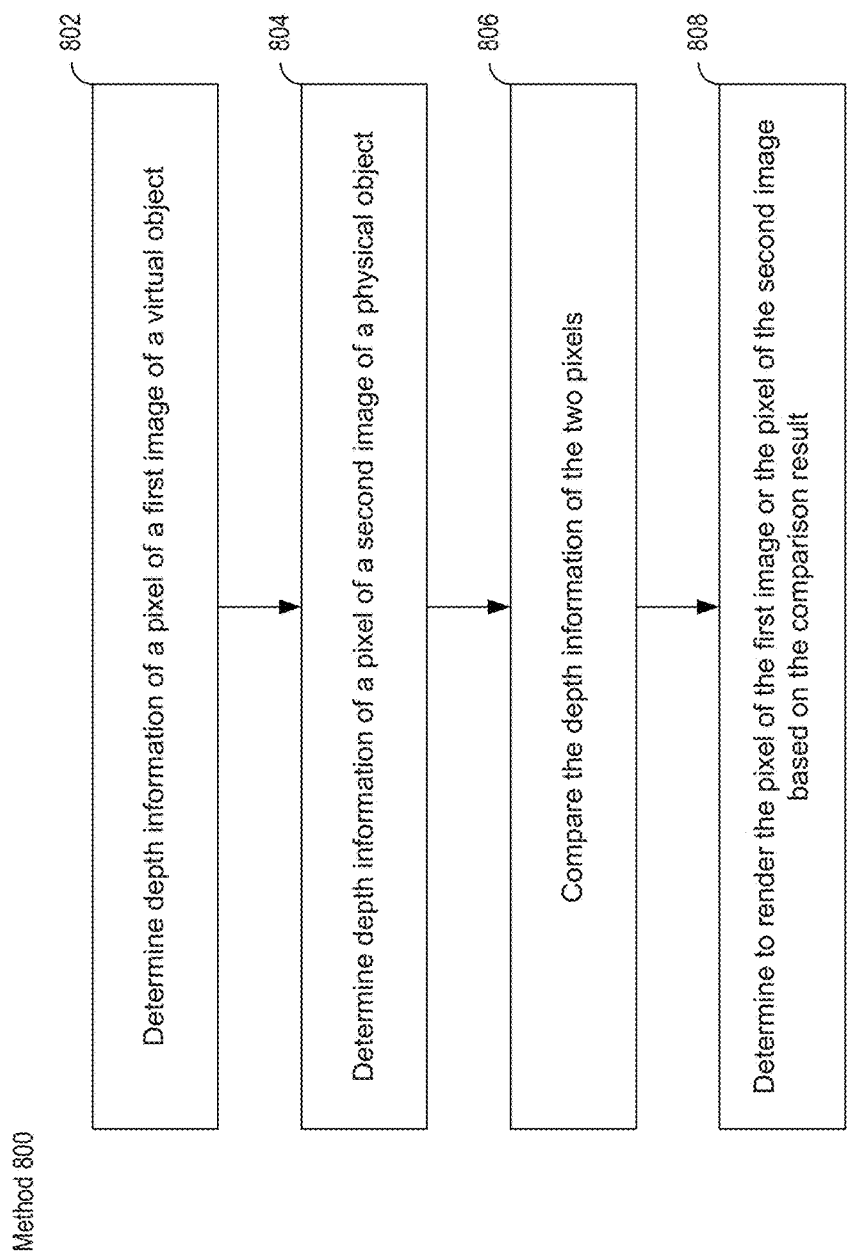
FIG. 8 is a flowchart of an exemplary method for blending of an image of 3D virtual object into real-time graphical images of a physical environment, consistent with embodiments of the present disclosure.

Graphics and audio rendering module 324 can be configured to determine the rendering of virtual object 704 and physical object 706 based on their depth information, as well as a location and an orientation of the cameras. Reference is now made to FIG. 8, which is a flow chart that illustrates an exemplary method 800 for blending virtual object image with graphical images of a physical environment, consistent with embodiments of the present disclosure. While method 800 is described as being performed by a processor (e.g., graphics and audio rendering module 324), it is appreciated that method 800 can be performed by other devices alone or in combination with the processor.

In step 802, the processor can receive depth information associated with a pixel of a first image of a virtual object (e.g., virtual object 704 of FIG. 7A). The depth information can be generated based on the location and orientation of camera 708 determined by, for example, orientation and position determination module 322 of FIG. 3. For example, based on a pre-determined location of the virtual object within a 3D map and the location of the camera in that 3D map, the processor can determine the distance between the camera and the virtual object.

In step 804, the processor can determine depth information associated with a pixel of a second image of a physical object (e.g., physical object 706 of FIG. 7A). The depth information can be generated based on the location and orientation of camera 708 determined by, for example, orientation and position determination module 322 of FIG. 3. For example, based on a previously-determined location of the physical object within a 3D map (e.g., with the SLAM algorithm) and the location of the camera in that 3D map, the distance between the camera and the physical object can be determined.

In step 806, the processor can compare the depth information of the two pixels, and then determine to render one of the pixels based on the comparison result, in step 808. For example, if the processor determines that a pixel of the physical object is closer to the camera than a pixel of the virtual object (e.g., at position A of FIG. 7B), the processor can determine that the pixel of the virtual object is obscured by the pixel of the physical object, and determine to render the pixel of the physical object.

Referring back to FIG. 3, in some embodiments, graphics and audio rendering module 324 can also provide audio data for rendering. The audio data can be collected from, e.g., audio sensing system 313 (such as microphone array). In some embodiments, to provide enhanced sensory capability, some of the audio data can be magnified based on a user instruction (e.g., detected via hand gesture). For example, using microphone arrays, graphics and audio rendering module 324 can determine a location of a source of audio data, and can determine to increase or decrease the volume of audio data associated with that particular source based on a user instruction. In a case where a virtual source of audio data is to be blended with the audio signals originated from the physical environment, graphics and audio rendering module 324 can also determine, in a similar fashion as method 800, a distance between the microphone and the virtual source, and a distance between the microphone and a physical objects. Based on the distances, graphics and audio rendering module 324 can determine whether the audio data from the virtual source is blocked by the physical object, and adjust the rendering of the audio data accordingly.

After determining the graphic and audio data to be rendered, graphics and audio rendering module 324 can then provide the graphic and audio data to audio/video system 330, which includes a display system 332 (e.g., a display screen) configured to display the rendered graphic data, and an audio output system 334 (e.g., a speaker) configured to play the rendered audio data. Graphics and audio rendering module 324 can also store the graphic and audio data at a storage (e.g., storage 128 of FIG. 1), or provide the data to a network interface (e.g., network interface 140 of FIG. 1) to be transmitted to another device for rendering. The rendered graphic data can overlay real-time graphics captured by sensing system 310. The rendered graphic data can also be altered or enhanced, such as increasing brightness or colorfulness, or changing painting styles. The rendered graphic data can also be associated with real-world locations of objects in the real-time graphics captured by sensing system 310.

In some embodiments, sensing system 310 (e.g. optical sensing system 312) may also be configured to monitor, in real-time, positions of a user of the system 300 (e.g. a user wearing system 900 described below) or body parts of the user, relative to objects in the user's surrounding environment, and send corresponding data to processing system 320 (e.g. orientation and position determination module 322). Processing system 320 may be configured to determine if a collision or contact between the user or body parts and the objects is likely or probable, for example by predicting a future movement or position (e.g., in the following 20 seconds) based on monitored motions and positions and determining if a collision may happen. If processing system 320 determines that a collision is probable, it may be further configured to provide instructions to audio/video system 330. In response to the instructions, audio/video system 330 may also be configured to display a warning, whether in audio or visual format, to inform the user about the probable collision. The warning may be a text or graphics overlaying the rendered graphic data.

In addition, system 300 also includes a power system 340, which typically includes a battery and a power management system (not shown in FIG. 3).

Some of the components (either software or hardware) of system 300 can be distributed across different platforms. For example, as discussed in FIG. 1, computing system 100 (based on which system 300 can be implemented) can be connected to smart devices 130 (e.g., a smart phone). Smart devices 130 can be configured to perform some of the functions of processing system 320. For example, smart devices 130 can be configured to perform the functionalities of graphics and audio rendering module 324. As an illustrative example, smart devices 130 can receive information about the orientation and position of the cameras from orientation and position determination module 322, and hand gesture information from hand gesture determination module 323, as well as the graphic and audio information about the physical environment from sensing system 310, and then perform the rendering of graphics and audio. As another illustrative example, smart devices 130 can be operating another software (e.g., an app), which can generate additional content to be added to the multimedia rendering. Smart devices 130 can then either provide the additional content to system 300 (which performs the rendering via graphics and audio rendering module 324), or can just add the additional content to the rendering of the graphics and audio data.

Figures 9A, 9B:
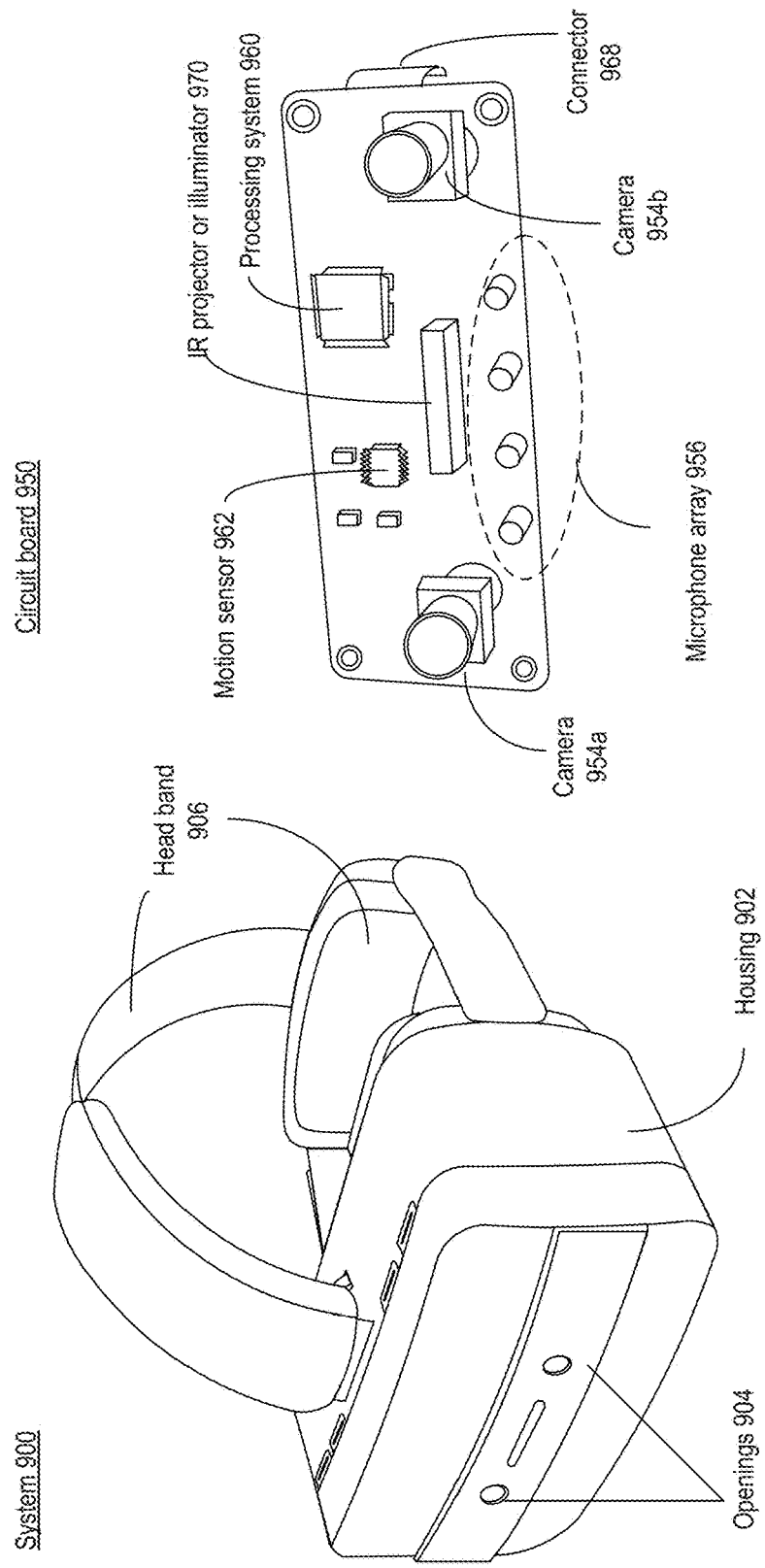
FIGS. 9A-9B are schematic diagrams illustrating an exemplary head-mount interactive immersive multimedia generation system, consistent with embodiments of the present disclosure.

FIGS. 9A-B are schematic diagrams illustrating an exemplary head-mount interactive immersive multimedia generation system 900, consistent with embodiments of the present disclosure. In some embodiments, system 900 includes embodiments of computing device 100, system 300, and camera system 494 of FIG. 4F.

As shown in FIG. 9A, system 900 includes a housing 902 with a pair of openings 904, and a head band 906. Housing 902 is configured to hold one or more hardware systems configured to generate interactive immersive multimedia data. For example, housing 902 can hold a circuit board 950 (as illustrated in FIG. 9B), which includes a pair of cameras 954a and 954b, one or more microphones 956, a processing system 960, a motion sensor 962, a power management system, one or more connectors 968, and IR projector or illuminator 970. Cameras 954a and 954b may include stereo color image sensors, stereo mono image sensors, stereo RGB-IR image sensors, ultra-sound sensors, and/or TOF image sensors. Cameras 954a and 954b are configured to generate graphical data of a physical environment. Microphones 956 are configured to collect audio data from the environment to be rendered as part of the immersive multimedia data. Processing system 960 can be a general purpose processor, a CPU, a GPU, a FPGA, an ASIC, a computer vision ASIC, etc., that is configured to perform at least some of the functions of processing system 300 of FIG. 3. Motion sensor 962 may include a gyroscope, an accelerometer, a magnetometer, and/or a signal processing unit. Connectors 968 are configured to connect system 900 to a mobile device (e.g., a smart phone) which acts as smart devices 130 of FIG. 1 to provide additional capabilities (e.g., to render audio and graphic data, to provide additional content for rendering, etc.), such that processing system 960 can communicate with the mobile device. In such a case, housing 902 also provides internal space to hold the mobile device. Housing 902 also includes a pair of lenses (not shown in the figures) and optionally a display device (which can be provided by the mobile device) configured to display a stereoscopic 3D image rendered by either the mobile device and/or by processing system 960. Housing 902 also includes openings 904 through which cameras 954 can capture images of the physical environment system 900 is located in.

As shown in FIG. 9A, system 900 further includes a set of head bands 906. The head bands can be configured to allow a person to wear system 900 on her head, with her eyes exposed to the display device and the lenses. In some embodiments, the battery can be located in the head band, which can also provide electrical connection between the battery and the system housed in housing 902.

Figure 10:
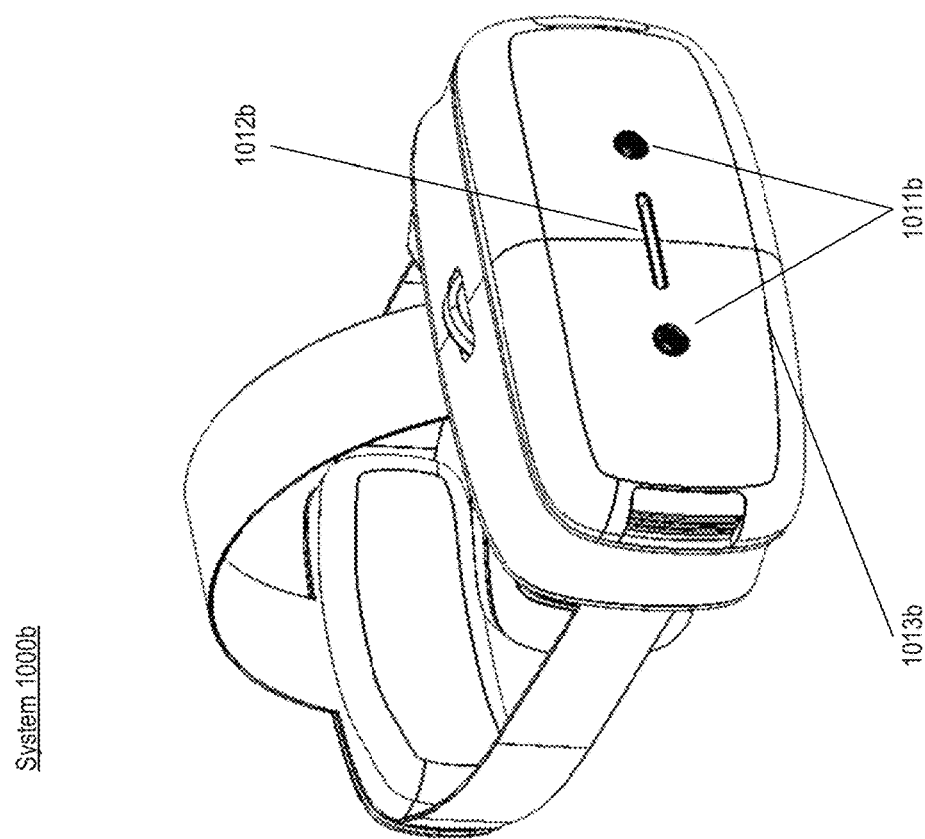
FIGS. 10A-10N are graphical illustrations of exemplary embodiments of an exemplary head-mount interactive immersive multimedia generation system, consistent with embodiments of the present disclosure.
Figure 10:
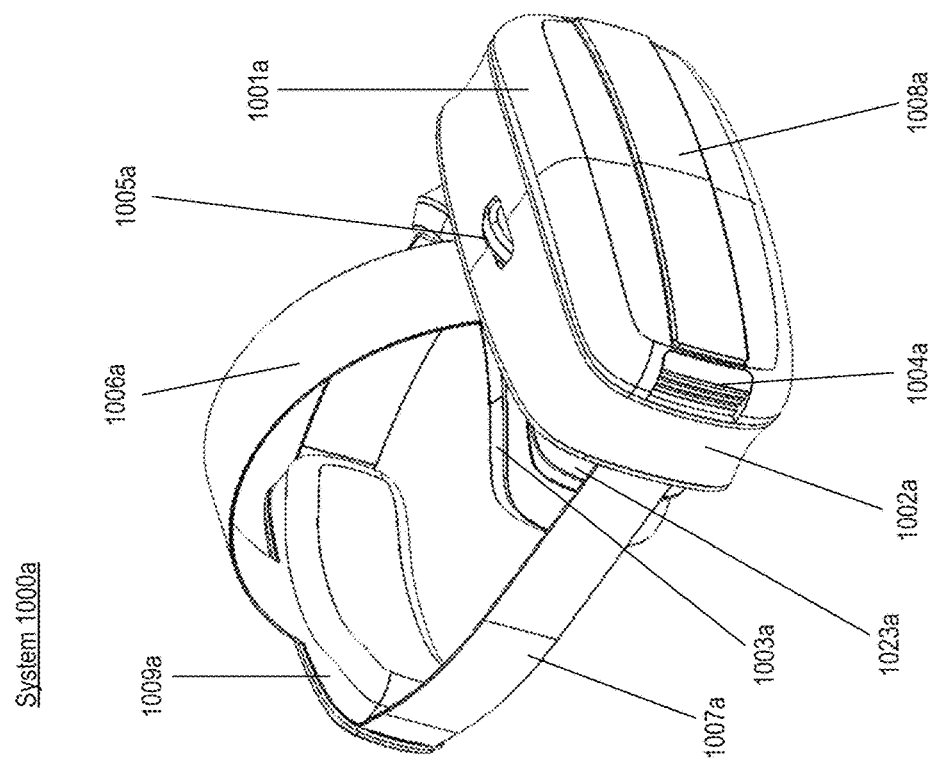
Figure 10:
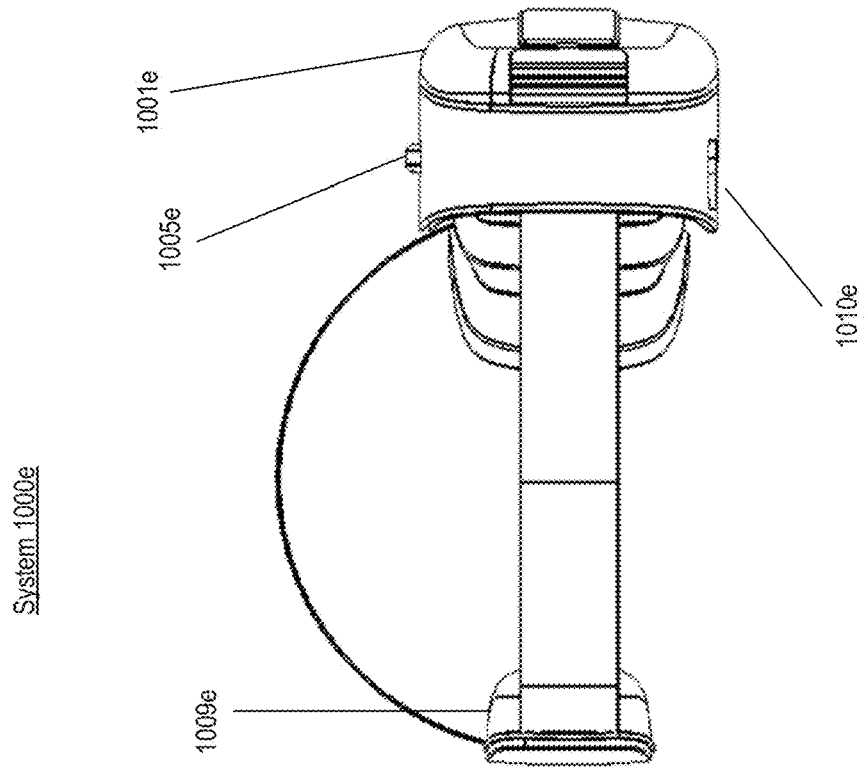
Figure 10:
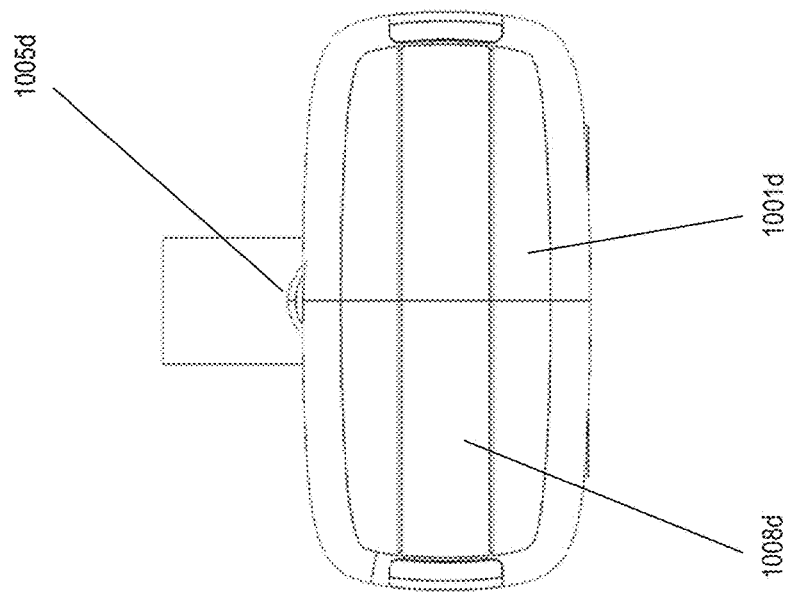
Figure 10:
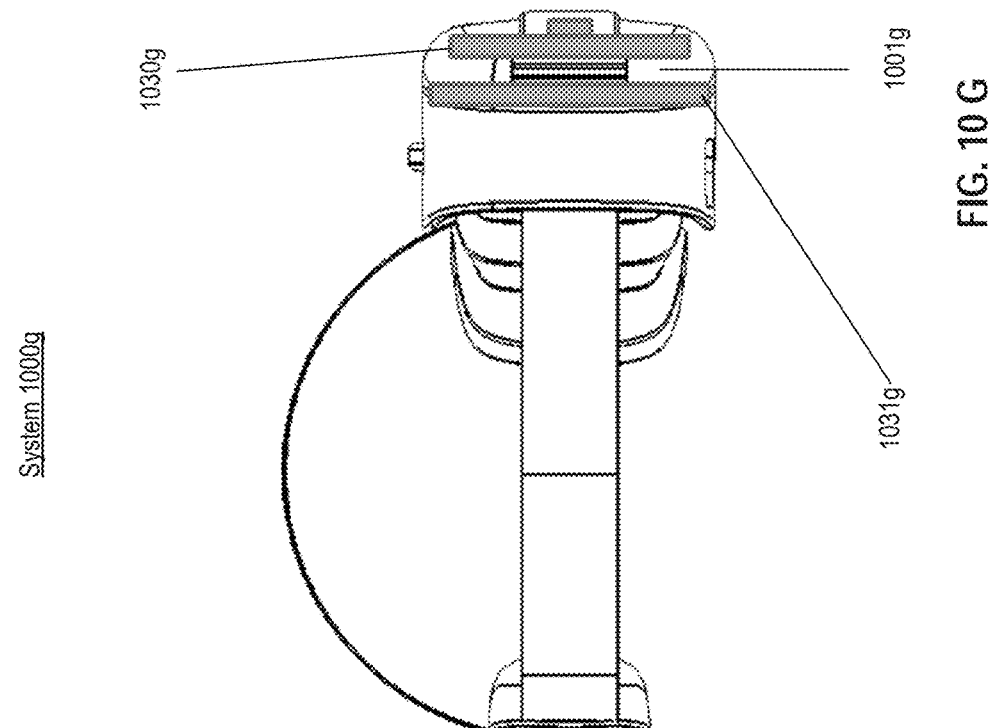
Figure 10:
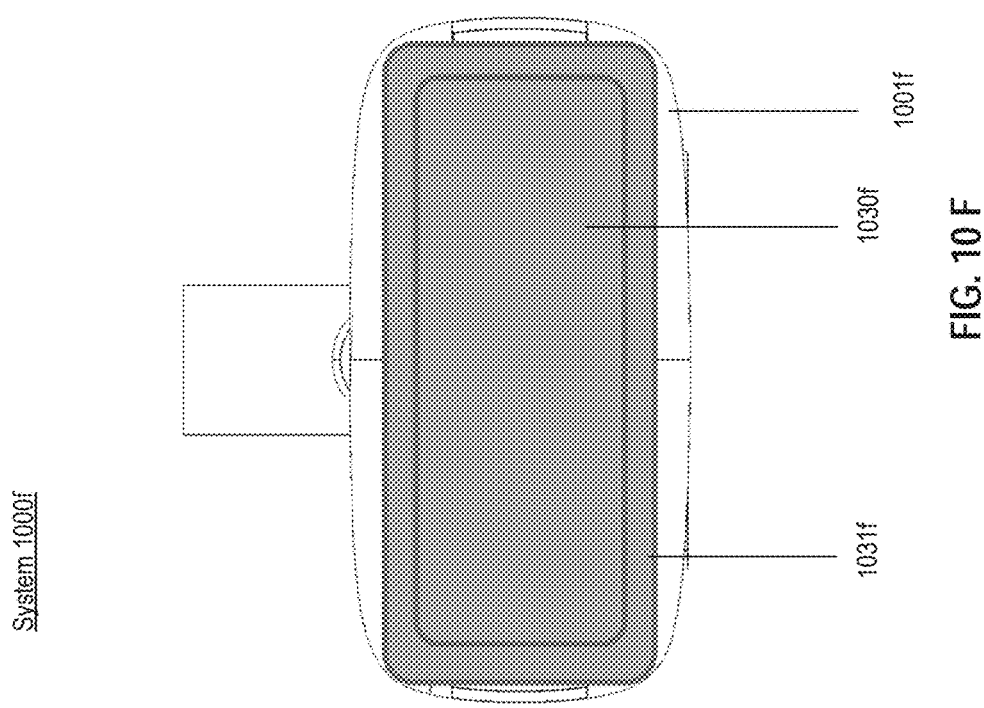
Figure 10:
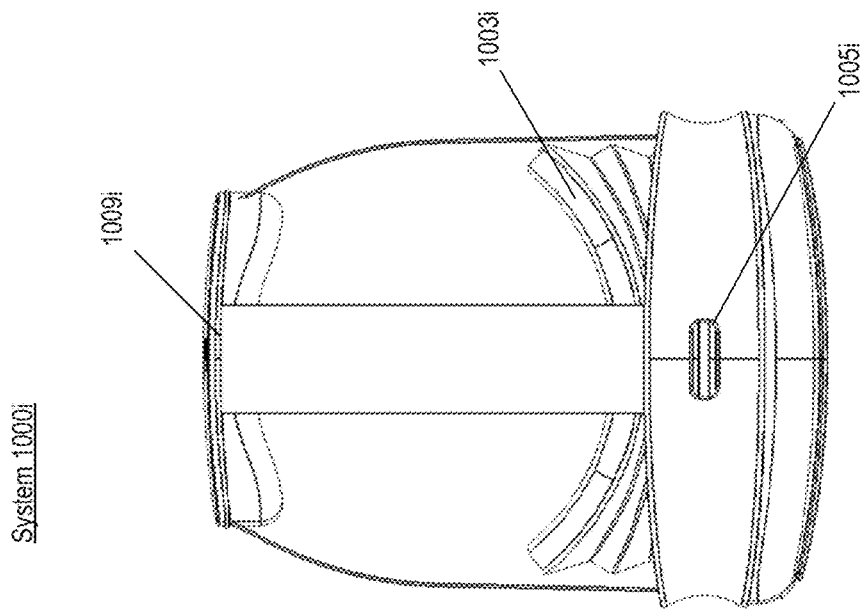
Figure 10:
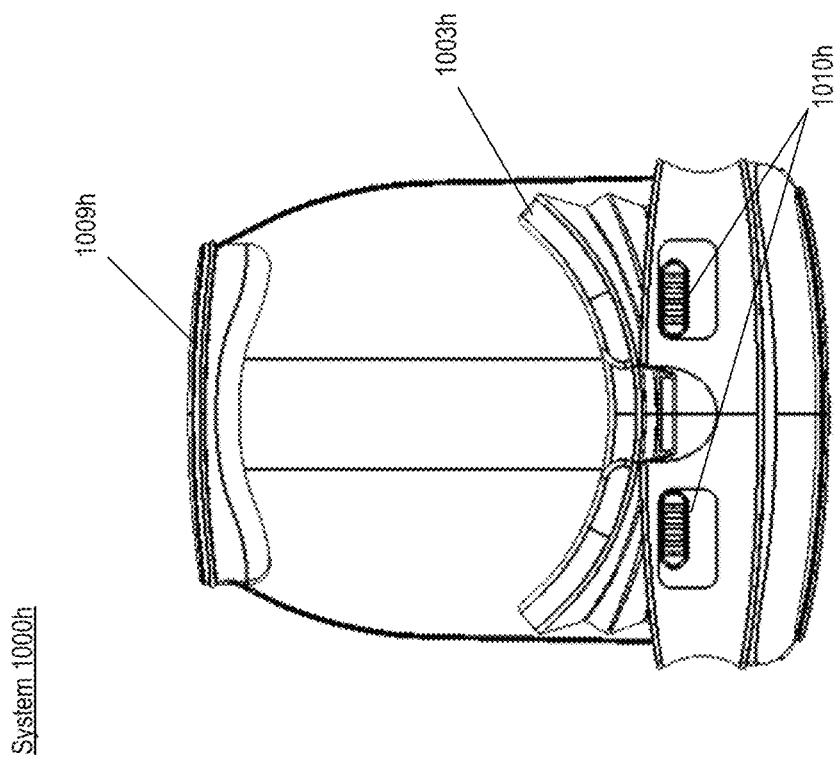
Figure 10:
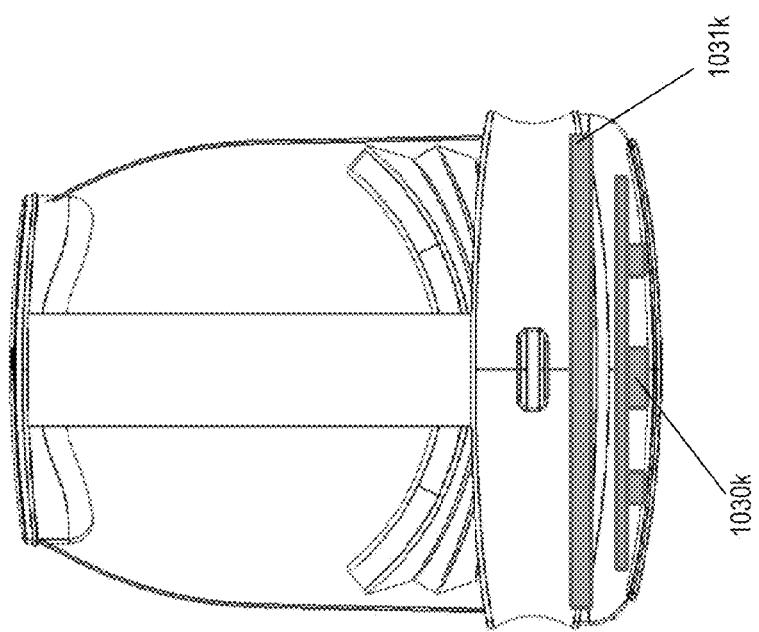
Figure 10:
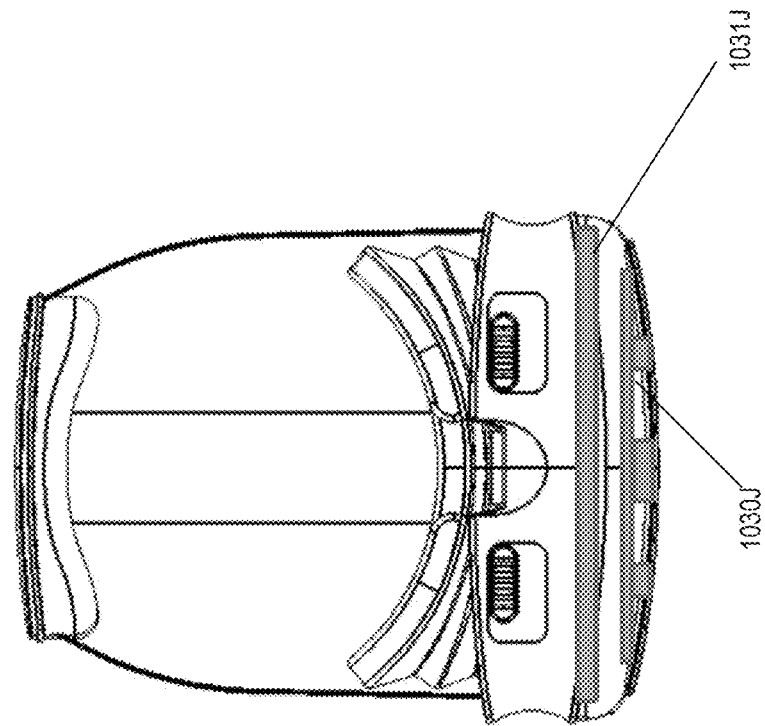
Figure 10:
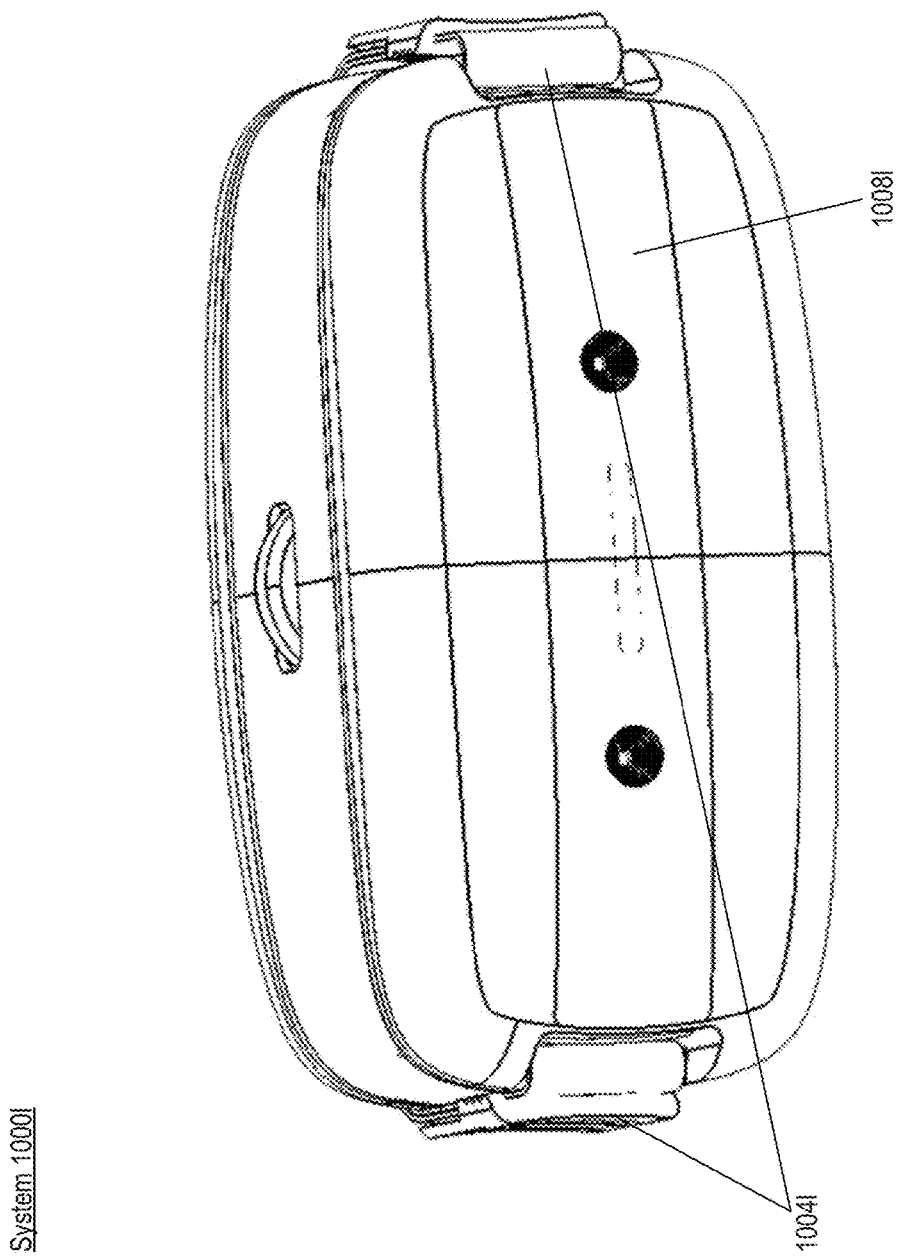
Figure 10:
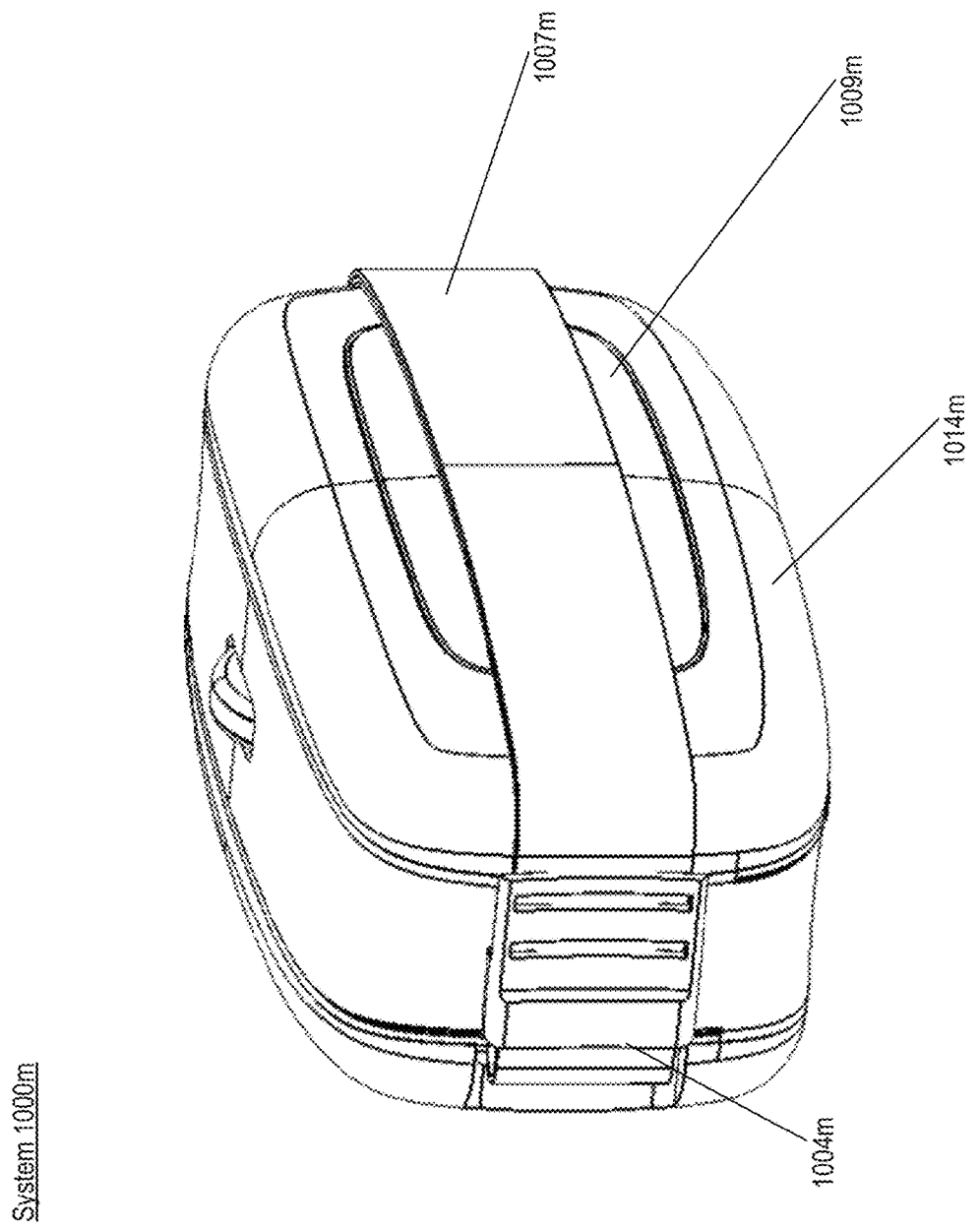
Figure 10:
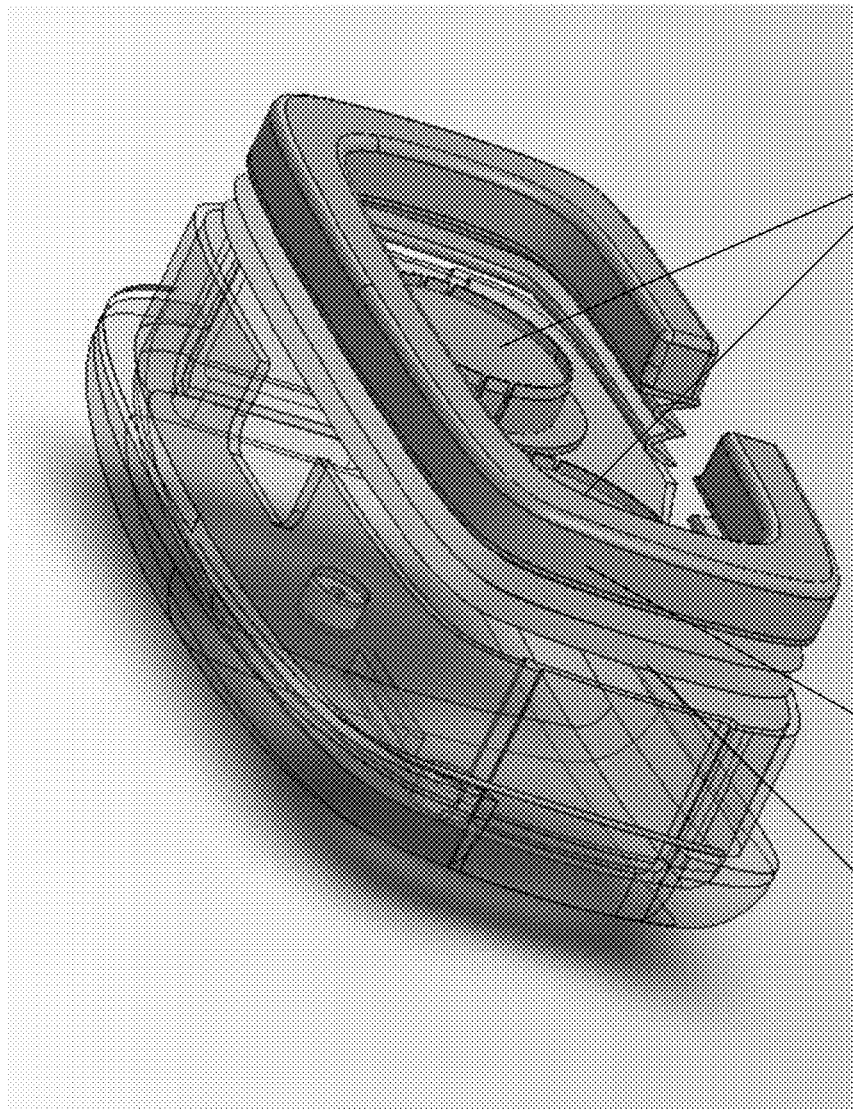

FIGS. 10A and 10N are graphical illustrations of exemplary embodiments of an head-mount interactive immersive multimedia generation system, consistent with embodiments of the present disclosure. Systems 1000a-1000n may refer to different embodiments of the same exemplary head-mount interactive immersive multimedia generation system, which is foldable and can be compact, at various states and from various viewing angles. Systems 1000a-1000n may be similar to system 900 described above and may also include circuit board 950 described above. The exemplary head-mount interactive immersive multimedia generation system can provide housing for power sources (e.g. batteries), for sensing and computation electronics described above, and for a user's mobile device (e.g. a removable or a built-in mobile device). The exemplary system can be folded to a compact shape when not in use, and be expanded to attach to a user's head when in use. The exemplary system can comprise an adjustable screen-lens combination, such that a distance between the screen and the lens can be adjusted to match with a user's eyesight. The exemplary system can also comprise an adjustable lens combination, such that a distance between two lenses can be adjusted to match a user's IPD.

As shown in FIG. 10A, system 1000a may include a number of components, some of which may be optional: a front housing 1001a, a middle housing 1002a, a foldable face cushion 1003a, a foldable face support 1023a, a strap latch 1004a, a focus adjustment knob 1005a, a top strap 1006a, a side strap 1007a, a decoration plate 1008a, and a back plate and cushion 1009a. FIG. 10A may illustrate system 1000a in an unfolded/open state.

Front housing 1001a and/or middle housing 1002a may be considered as one housing configured to house or hold electronics and sensors (e.g., system 300) described above, foldable face cushion 1003a, foldable face support 1023a, strap latch 1004a, focus adjustment knob 1005a, decoration plate 1008a, and back plate and cushion 1009a. Front housing 1001a may also be pulled apart from middle housing 1002a or be opened from middle housing 1002a with respect to a hinge or a rotation axis. Middle housing 1002a may include two lenses and a shell for supporting the lenses. Front housing 1001a may also be opened to insert a smart device described above. Front housing 1001a may include a mobile phone fixture to hold the smart device.

Foldable face support 1023a may include three configurations: 1) foldable face support 1023a can be pushed open by built-in spring supports, and a user to push it to close; 2) foldable face support 1023a can include bendable material having a natural position that opens foldable face support 1023a, and a user to push it to close; 3) foldable face support 1023a can be air-inflated by a micro-pump to open as system 1000a becomes unfolded, and be deflated to close as system 1000a becomes folded.

Foldable face cushion 1003a can be attached to foldable face support 1023a. Foldable face cushion 1003a may change shape with foldable face support 1023a and be configured to lean middle housing 1002a against the user's face. Foldable face support 1023a may be attached to middle housing 1002a. Strap latch 1004a may be connected with side strap 1007a. Focus adjustment knob 1005a may be attached to middle housing 1002a and be configured to adjust a distance between the screen and the lens described above to match with a user's eyesight (e.g. adjusting an inserted smart device's position inside front housing 1001a, or moving front housing 1001a from middle housing 1002a).

Top strap 1006a and side strap 1007a may each be configured to attach the housing to a head of a user of the apparatus, when the apparatus is unfolded. Decoration plate 1008a may be removable and replaceable. Side strap 1007a may be configured to attach system 1000a to a user's head. Decoration plate 1008a may be directly clipped on or magnetically attached to front housing 1001a. Back plate and cushion 1009a may include a built-in battery to power the electronics and sensors. The battery may be wired to front housing 1001a to power the electronics and the smart device. The Back plate and cushion 1009a and/or top strap 1006a may also include a battery charging contact point or a wireless charging receiving circuit to charge the battery. This configuration of the battery and related components can balance a weight of the front housing 1001a and middle housing 1002a when system 1000a is put on a user's head.

As shown in FIG. 10B, system 1000b illustrates system 1000a with decoration plate 1008a removed, and system 1000b may include openings 1011b, an opening 1012b, and an opening 1013b on a front plate of system 1000a. Openings 1011b may fit for the stereo cameras describe above (e.g. camera 954a and camera 954b), opening 1012b may fit for lighter emitters (e.g. IR projector or illuminator 970, laser projector, and LED), and opening 1013b may fit for a microphone (e.g. microphone array 956).

As shown in FIG. 10C, system 1000c illustrates a part of system 1000a from a different viewing angle, and system 1000c may include lenses 1015c, a foldable face cushion 1003c, and a foldable face support 1023c.

As shown in FIG. 10D, system 1000d illustrates system 1000a from a different viewing angle (front view), and system 1000d may include a front housing 1001d, a focus adjustment knob 1005d, and a decoration plate 1008d.

As shown in FIG. 10E, system 1000e illustrates system 1000a from a different viewing angle (side view), and system 1000e may include a front housing 1001e, a focus adjustment knob 1005e, a back plate and cushion 1009e, and a slider 1010e. Slider 1010e may be attached to middle housing 1002a described above and be configured to adjust a distance between the stereo cameras and/or a distance between corresponding openings 1011b described above. For example, slider 1010e may be linked to lenses 1015c described above, and adjusting slider 1010e can in turn adjust a distance between lenses 1015c.

As shown in FIG. 10F, system 1000f illustrates system 1000a including a smart device and from a different viewing angle (front view). System 1000f may include a circuit board 1030f (e.g., circuit board 950 described above), a smart device 1031f described above, and a front housing 1001f. Smart device 1031f may be built-in or inserted by a user. Circuit board 1030f and smart device 1031f may be mounted inside front housing 1001f. Circuit board 1030f may communicate with smart device 1031f via a cable or wirelessly to transfer data.

As shown in FIG. 10G, system 1000g illustrates system 1000a including a smart device and from a different viewing angle (side view). System 1000g may include a circuit board 1030g (e.g., circuit board 950 described above), a smart device 1031g described above, and a front housing 1001g. Smart device 1031g may be built-in or inserted by a user. Circuit board 1030g and smart device 1031g may be mounted inside front housing 1001g.

As shown in FIG. 10H, system 1000h illustrates system 1000a from a different viewing angle (bottom view), and system 1000h may include a back plate and cushion 1009h, a foldable face cushion 1003h, and sliders 1010h. Sliders 1010h may be configured to adjust a distance between the stereo cameras and/or a distance between corresponding openings 1011b described above.

As shown in FIG. 10I, system 1000i illustrates system 1000a from a different viewing angle (top view), and system 1000i may include a back plate and cushion 1009i, a foldable face cushion 1003i, and a focus adjustment knob 1005i. Sliders 1010h may be configured to adjust a distance between the stereo cameras and/or a distance between corresponding openings 1011b described above.

As shown in FIG. 10J, system 1000j illustrates system 1000a including a smart device and from a different viewing angle (bottom view). System 1000j may include a circuit board 1030j (e.g., circuit board 950 described above) and a smart device 1031j described above. Smart device 1031j may be built-in or inserted by a user.

As shown in FIG. 10K, system 1000k illustrates system 1000a including a smart device and from a different viewing angle (top view). System 1000k may include a circuit board 1030k (e.g., circuit board 950 described above) and a smart device 1031k described above. Smart device 1031k may be built-in or inserted by a user.

As shown in FIG. 10L, system 1000*l* illustrates system 1000*a* in a closed/folded state and from a different viewing angle (front view). System 1000*k* may include strap latches 1004*l* and a decoration plate 1008*l*. Strap latches 1004*l* may be configured to hold together system 1000*l* in a compact shape. Decoration plate 1008*l* may cover the openings, which are drawn as see-through openings in FIG. 10L.

As shown in FIG. 10M, system 1000*m* illustrates system 1000*a* in a closed/folded state and from a different viewing angle (back view). System 1000*m* may include a strap latch 1004*m*, a back cover 1014*m*, a side strap 1007*m*, and a back plate and cushion 1009*m*. Back plate and cushion 1009*m* may include a built-in battery. Side strap 1007*m* may be configured to keep system 1000*m* in a compact shape, by closing back plate 1009*m* to the housing to fold system 1000*m*.

As shown in FIG. 10N, system 1000*n* illustrates a part of system 1000*a* in a closed/folded state, and system 1000*n* may include lenses 1015*n*, a foldable face cushion 1003*n* in a folded state, and a foldable face support 1023*n* in a folded state.

FIG. 11 is a graphical illustration of steps unfolding an exemplary head-mount interactive immersive multimedia generation system 1100, similar to those described above with reference to FIGS. 10A-10N, consistent with embodiments of the present disclosure.

At step 111, system 1100 is folded/closed.

At step 112, a user may unbuckle strap latches (e.g., strap latches 1004*l* described above).

At step 113, the user may unwrap side straps (e.g., side straps 1007*m* described above). Two views of this step are illustrated in FIG. 11. From step 111 to step 113, the top strap is enclosed in the housing.

At step 114, the user may remove a back cover (e.g., back cover 1014*m* described above).

At step 115, the user may pull out the side straps and a back plate and cushion (e.g., back plate and cushion 1009*a* described above). In the meanwhile, a foldable face cushion and a foldable face support spring out from a folded/closed state (e.g., a foldable face cushion 1003*n*, a foldable face support 1023*n* described above) to an unfolded/open state (e.g., a foldable face cushion 1003*a*, a foldable face support 1023*a* described above). Two views of this step are illustrated in FIG. 11.

At step 116, after pulling the side straps and a back plate and cushion to an end position, the user secures the strap latches and obtains an unfolded/open system 1100.

Figure 12:
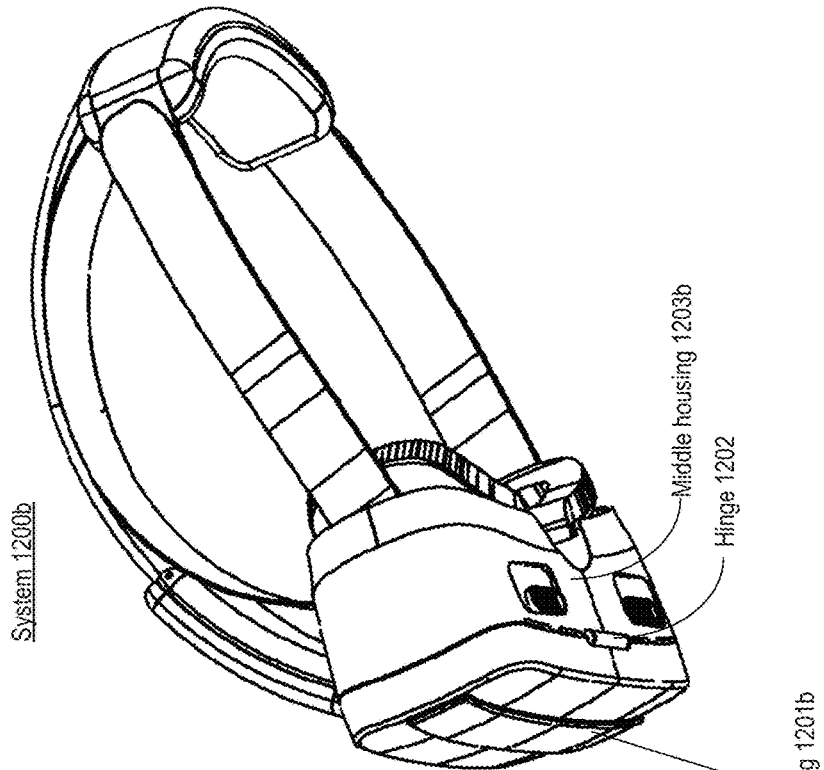
FIGS. 12A and 12B are graphical illustrations of an exemplary head-mount interactive immersive multimedia generation system, consistent with embodiments of the present disclosure.
Figure 12:
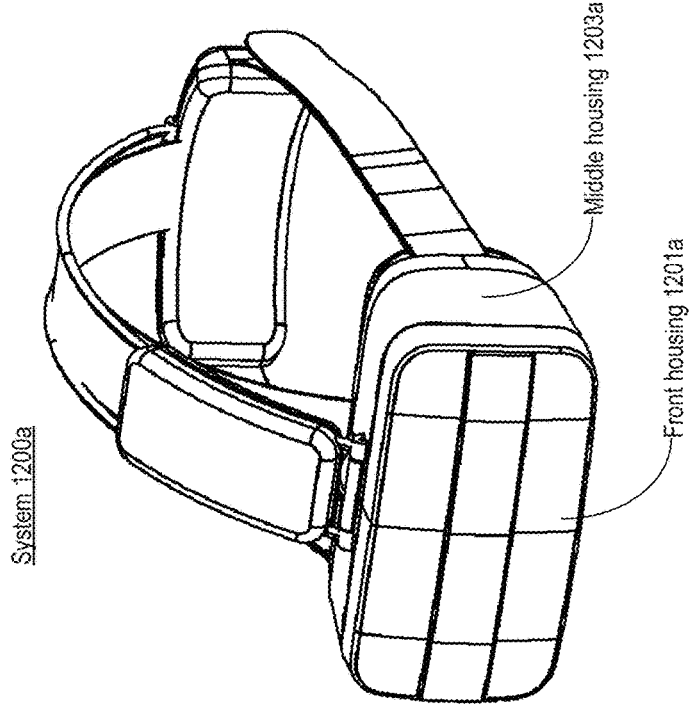

FIGS. 12A and 12B are graphical illustrations of an exemplary head-mount interactive immersive multimedia generation system, consistent with embodiments of the present disclosure. Systems 1200*a* and 1200*b* illustrate the same exemplary head-mount interactive immersive multimedia generation system from two different viewing angles. System 1200*a* may include a front housing 1201*a*, a hinge (not shown in the drawings), and a middle housing 1203*a*. System 1200*b* may include a front housing 1201*b*, a hinge 1202, and a middle housing 1203*b*. Hinge 1202 may attach front housing 1201*b* to middle housing 1203*b*, allowing front housing 1201*b* to be closed to or opened from middle housing 1203*b* while attached to middle housing 1203*b*. This structure is simple and easy to use, and can provide protection to components enclosed in the middle housing.

With embodiments of the present disclosure, accurate tracking of the 3D position and orientation of a user (and the camera) can be provided. Based on the position and orientation information of the user, interactive immersive multimedia experience can be provided. The information also enables a realistic blending of images of virtual objects and images of physical environment to create a combined experience of augmented reality and virtual reality. Embodiments of the present disclosure also enable a user to efficiently update the graphical and audio rendering of portions of the physical environment to enhance the user's sensory capability.

In the foregoing specification, embodiments have been described with reference to numerous specific details that can vary from implementation to implementation. Certain adaptations and modifications of the described embodiments can be made. Furthermore, one skilled in the art may appropriately make additions, removals, and design modifications of components to the embodiments described above, and may appropriately combine features of the embodiments; such modifications also are included in the scope of the invention to the extent that the spirit of the invention is included. Other embodiments can be apparent to those skilled in the art from consideration of the specification and practice of the invention disclosed herein. It is intended that the specification and examples be considered as exemplary only, with a true scope and spirit of the invention indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A foldable apparatus, comprising:
    at least one camera configured to acquire an image of a physical environment;
    an orientation and position determination module configured to determine a change in orientation and/or position of the apparatus with respect to the physical environment based on the acquired image, to determine depth information of a virtual object based on a predetermined location of the virtual object and a location of the at least one camera, and to determine depth information of a physical object based on a pre-determined location of the physical object and the location of the at least one camera, and wherein the depth information of the virtual object is associated with a pixel of a first image of the virtual object and the depth information of the physical object is associated with a pixel of a second image of the physical object;
    a graphics and audio rendering module configured to:
        determine rendering of a visual image including the virtual object and the physical object in the physical environment based on their depth information, wherein the depth information of the virtual object is compared with the depth information of the physical object in the physical environment to render the pixel of the first image or the pixel of the second image based on the comparison result; and
        determine a virtual audio source in the physical environment, and based on a distance between the virtual audio source and the physical object in the physical environment, adjust rendering of audio;
    a housing configured to hold the at least one camera and the orientation and position determination module; and
    a first strap attached to the housing and configured to attach the housing to a head of a user of the apparatus.

2. The apparatus of claim 1, wherein:
    the at least one camera is further configured to monitor, in real-time, positions of the user relative to objects in the physical environment; and the orientation and position determination module is further configured to:
  determine, based on the monitored positions, if the user will collide with one of the objects in the physical environment, and
  provide instructions to display a warning overlaying a rendering of the physical environment.

3. The apparatus of claim 1, wherein:
the at least one camera is further configured to monitor, in real-time, the physical object in the physical environment; and
the orientation and position determination module is further configured to:
  generate a 3D model of the physical environment, the 3D model including a position of the physical object; and
  provide instructions to display a virtual object at the position in the rendering of the physical environment.

4. The apparatus of claim 1, wherein the housing comprises a detachable back plate to enclose the first strap inside the housing, when the apparatus is folded.

5. The apparatus of claim 4, further comprising a second strap attached to the housing and configured to:
  attach the housing to a head of a user of the apparatus, when the apparatus is unfolded; and
  attach the back plate to the housing to fold the apparatus.

6. The apparatus of claim 4, wherein at least one of the back plate or the first strap comprises:
  a battery; and
  at least one of a charging contact point or a wireless charging receiving circuit to charge the battery.

7. The apparatus of claim 1, wherein the housing comprises a mobile phone fixture to hold a mobile phone inside the housing.

8. The apparatus of claim 1, wherein the housing comprises:
  a foldable face support attached to the housing; and
  a foldable face cushion attached to the foldable face support, wherein the foldable face cushion in configured to lean the housing against the user's face.

9. The apparatus of claim 8, wherein the foldable face support comprises a spring support.

10. The apparatus of claim 8, wherein the foldable face support is a bendable material.

11. The apparatus of claim 8, wherein:
  the foldable face support is inflated by a micro air-pump, when the apparatus is unfolded; and
  the foldable face support is deflated by the micro air-pump, when the apparatus is folded.

12. The apparatus of claim 1, further comprising at least one of a gyroscope, an accelerometer, or a magnetometer, held by the housing.

13. The apparatus of claim 1, further comprising a hand gesture determination module configured to detect a hand gesture from the acquired image and held by the housing.

14. The apparatus of claim 13, wherein the graphics and audio rendering module is further configured to adjust rendering of audio based on the detected hand gesture.

15. The apparatus of claim 1, wherein the housing comprises a front plate, the front plate comprising openings.

16. The apparatus of claim 15, further comprising at least two cameras and an infrared emitter held by the housing, the at least two cameras and the infrared emitter monitoring the physical environment through the openings.

17. The apparatus of claim 16, further comprising at least two lenses corresponding to the two cameras.

18. The apparatus of claim 17, further comprising a slider configured to adjust at least one of a distance between the at least two cameras, a distance between the openings, or a distance between the at least two lenses, to match with the user's inter-pupil distances.

19. The apparatus of claim 16, further comprising a display screen to display a rendering of the physical environment.

20. The apparatus of claim 19, further comprising a focus adjustment knob configured to adjust a distance between the at least two lenses and the display screen.

21. The apparatus of claim 1, wherein the housing further comprises a decoration plate to cover the openings, when the apparatus is not in use.

\* \* \* \* \*